US 6,249,002 B1
Jun. 19, 2001

(12) United States Patent
Butler

(54) BOLOMETRIC FOCAL PLANE ARRAY

(75) Inventor: Neal R. Butler, Acton, MA (US)

(73) Assignee: Lockheed-Martin IR Imaging Systems, Inc., Lexington, MA (US)

( * ) Notice: Subject to any disclaimer, the term of this patent is extended or adjusted under 35 U.S.C. 154(b) by 0 days.

(21) Appl. No.: 09/011,942

(22) PCT Filed: Aug. 30, 1996

(86) PCT No.: PCT/US96/13853

§ 371 Date: Aug. 24, 1998

§ 102(e) Date: Aug. 24, 1998

(87) PCT Pub. No.: WO97/08753

PCT Pub. Date: Mar. 6, 1997

(51) Int. Cl.[7] .................................................. H01L 31/09
(52) U.S. Cl. .................. 250/338.4; 250/332; 250/370.08
(58) Field of Search ........................... 250/338.4, 370.08, 250/332

(56) References Cited

U.S. PATENT DOCUMENTS

| 3,621,258 | 11/1971 | Dreitzler . |
| 3,665,190 | 5/1972 | Kotera et al. . |

(List continued on next page.)

FOREIGN PATENT DOCUMENTS

| 0 534 769 A2 | 3/1993 | (EP) . |
| 2 554 999 | 5/1986 | (FR) . |
| 2 202 702 | 9/1988 | (GB) . |
| WO 90/16082 | 12/1990 | (WO) . |
| PCT/WO92/ 06561 | 4/1992 | (WO) . |
| PCT/WO93/ 09414 | 5/1993 | (WO) . |
| PCT/WO93/ 18492 | 9/1993 | (WO) . |
| PCT/WO93/ 26050 | 12/1993 | (WO) . |
| PCT/WO94/ 00950 | 1/1994 | (WO) . |

OTHER PUBLICATIONS

Abstract of foreing patent No. EPA–0324925, Jul. 26, 1989, Mitsubishi Denki.
Abstract of foreing patent No., JP 57–124726, Aug. 3, 1982, Mitsubishi Denki.
Abstract of foreing patent No. JP 3–179977, Aug. 5, 1991, Mitsubishi Elec. Corp.
Abstract of foreing patent No. JP 6–86174, Mar. 24, 1994, NEC Corp.
Abstract of foreing patent No. JP 3–289777, Feb. 19, 1991,. NEC Corp.

(List continued on next page.)

*Primary Examiner*—Constantine Hannaher
(74) *Attorney, Agent, or Firm*—Wolf, Greenfield & Sacks, P.C.

(57) ABSTRACT

An array of infrared sensitive bolometric detectors. The bolometers are connected across row and column readout lines. Integrated on the array are column signal processors that measure the resistance of each bolometer. Each column signal processor stores the output of a bolometer on an integrator. The array is temperature stabilized to a predetermined temperature to keep bolometer response within a predetermined bandwith.

35 Claims, 26 Drawing Sheets

U.S. PATENT DOCUMENTS

| | | |
|---|---|---|
| 3,891,843 | 6/1975 | Parkin . |
| 3,961,325 | 6/1976 | Kendall et al. ...................... 340/347 |
| 3,971,015 | 7/1976 | Rode . |
| 3,973,146 | 8/1976 | Arnold et al. . |
| 4,176,398 | 11/1979 | Rider .................................... 364/607 |
| 4,276,474 | 6/1981 | Crawford . |
| 4,369,463 | 1/1983 | Anastassiou et al. . |
| 4,380,755 | 4/1983 | Endlicher et al. ...................... 382/68 |
| 4,513,390 | 4/1985 | Walter et al. . |
| 4,587,426 | 5/1986 | Munier et al. . |
| 4,589,024 | 5/1986 | Koch et al. ........................... 358/213 |
| 4,609,824 | 9/1986 | Munier et al. . |
| 4,628,364 | 12/1986 | Koch .................................... 358/213 |
| 4,652,766 | 3/1987 | Wang et al. . |
| 4,654,622 | 3/1987 | Foss et al. ............................. 338/14 |
| 4,659,928 | 4/1987 | Tew . |
| 4,679,068 | 7/1987 | Lillquist et al. . |
| 4,684,812 | 8/1987 | Tew et al. . |
| 4,686,373 | 8/1987 | Tew et al. . |
| 4,738,409 | 4/1988 | Baumeister .......................... 358/213 |
| 4,745,278 | 5/1988 | Hanson . |
| 4,752,694 | 6/1988 | Hegel, Jr. et al. . |
| 4,754,139 | 6/1988 | Ennulat et al. . |
| 4,792,681 | 12/1988 | Hanson . |
| 4,808,822 | 2/1989 | Manning et al. ..................... 250/332 |
| 4,831,257 | 5/1989 | McClelland et al. . |
| 4,879,598 | 11/1989 | Seto ...................................... 358/113 |
| 4,902,895 | 2/1990 | Hanson . |
| 4,922,116 | 5/1990 | Grinberg et al. ................. 250/495.1 |
| 4,956,686 | 9/1990 | Borrello et al. . |
| 4,967,082 | 10/1990 | Cooke et al. . |
| 4,991,109 | 2/1991 | Crookshanks . |
| 4,991,127 | 2/1991 | Crookshanks . |
| 5,010,251 | 4/1991 | Grinberg et al. . |
| 5,021,663 | 6/1991 | Hornbeck . |
| 5,045,685 | 9/1991 | Wall . |
| 5,084,704 | 1/1992 | Parrish . |
| 5,129,595 | 7/1992 | Thiede et al. . |
| 5,134,474 | 7/1992 | Hanafusa et al. . |
| 5,166,810 | 11/1992 | Sorimachi et al. ................... 358/462 |
| 5,175,802 | 12/1992 | Crookshanks . |
| 5,185,883 | 2/1993 | Ianni et al. . |
| 5,200,623 | 4/1993 | Cannata . |
| 5,201,582 | 4/1993 | Lesniak . |
| 5,204,761 | 4/1993 | Gusmano . |
| 5,216,510 | 6/1993 | Amingual et al. ................ 358/213.1 |
| 5,268,576 | 12/1993 | Dudley . |
| 5,288,649 | 2/1994 | Keenan . |
| 5,300,915 | 4/1994 | Higashi et al. . |
| 5,326,726 | 7/1994 | Tsang et al. . |
| 5,367,167 | 11/1994 | Keenan ............................. 250/338.4 |
| 5,369,280 | 11/1994 | Liddiard . |
| 5,389,788 | 2/1995 | Grinberg et al. ..................... 250/331 |
| 5,399,889 | 3/1995 | Miyake et al. . |
| 5,420,419 | 5/1995 | Wood . |
| 5,442,176 | 8/1995 | Eckel, Jr. et al. . |
| 5,446,284 | 8/1995 | Butler et al. . |
| 5,486,698 | 1/1996 | Hanson et al. . |
| 5,489,776 | 2/1996 | Lung . |
| 5,512,748 | 4/1996 | Hanson . |
| 5,532,484 | 7/1996 | Sweetser et al. . |
| 5,541,412 | 7/1996 | Tanaka et al. ....................... 250/332 |
| 5,554,849 | 9/1996 | Gates ............................. 250/370.08 |
| 5,559,332 | 9/1996 | Meissner et al. ................. 250/338.2 |
| 5,563,405 | 10/1996 | Woolaway, II et al. .......... 250/208.1 |
| 5,572,029 | 11/1996 | Walker et al. .................... 250/338.3 |
| 5,578,826 | 11/1996 | Walker et al. .................... 250/338.3 |
| 5,591,973 | 1/1997 | Masarik et al. . |
| 5,600,369 | 2/1997 | Cazaux et al. ....................... 348/218 |
| 5,650,622 | 7/1997 | Ookawa et al. . |
| 5,656,848 | 8/1997 | Beratan et al. . |
| 5,698,852 | 12/1997 | Tanaka et al. ....................... 250/332 |
| 5,756,999 | 5/1998 | Parrish et al. ....................... 250/332 |

OTHER PUBLICATIONS

Co–pending U.S. Patent Application, Serial No. 08/973,058, filed May 26, 1998, Neal R. Butler, "Monolithic Analog–to–Digital Converter", Attorney Docket No.: L0501/7020.

Co–pending U.S. Patent Application, Serial No. 08/981,109, filed May 26, 1998, Neal R. Butler, "Digital Offset Corrector", Attorney Docket No.: L0501/7021.

Co–pending U.S. Patent Application, Serial No. 09/051,180, filed Sep. 14, 1998, Neal R. Butler and Charles M. Marshall, "Uncooled Focal Plane Array Sensor", Attorney Docket No.: L0501/7023.

International Search Report for PCT application PCT/US96/13853.

IEEE Journal of Solid–State Circuits, vol. 30, No. 6, Jun. 1, 1995, pp. 710–714, Holman, W.T., et al., "A Compact Low Noise Operational Amplifier For A 1.2 $\mu$ Digital CMOS Technology".

International Search Report issued in International Patent Application PCT/US96/11014 Filed Jun. 28, 1996.

O.B. Milgrome et al., "A 12 Bit Analog to Digital Converter for VLSI Applications in Nuclear Science," 1992, pp. 771–775, IEEE Transactions on Nuclear Science, vol. 39, No. 4.

O.B. Milgrome et al., "A Monolithic CMOS 16 Channel, 12 Bit, 10 Microsecond Analog to Digital Converter Integrated Circuit," Aug. 1993, pp. 721–723, IEEE Transactions on Nuclear Science, vol. 40, No. 4.

N. Butler et al., "Dual Use Low Cost Uncooled Microbolometer Imaging System," Jul. 12, 1995, Presented at SPIUE, San Diego, CA.

N. Butler et al., "Advanced Microbolometer Digital Output Focal Plane Array," Jul. 1996.

W.T. Holman, "A Compact Low Noise Operational Amplifier for a 1.2$\mu$ Digital CMOS Technology," Jun. 30, 1995, pp. 710–714, IEEE Journal of Solid–State Circuits, vol. 30, No. 6.

BOLOMETRIC FOCAL PLANE ARRAY

BACKGROUND OF THE INVENTION

1. Field of the Invention

The invention relates to a bolometric focal plane array and more particularly to a bolometric focal plane array having an integrated signal processor for processing signals from an array of bolometer detectors.

2. Discussion of the Related Art

Thermal radiation detectors that operate at room temperature have been known for more than 100 years. Recently, the availability of integrated circuit and micromachining technology has revived interest in this field. It is now practical to manufacture an array containing many thousands of these detectors along with signal processing electronics.

A bolometer is a thermal radiation detector that operates by first absorbing incident electromagnetic radiation and converting the absorbed energy into heat. The resulting temperature change of the detector is then sensed by measuring its resistance, which is a function of temperature. In a large array of such detectors, it is practical to measure the resistance of only a few detectors at any given time without compromising the signal to noise ratio of the system. The signal to noise ratio is a very important parameter for practical systems.

As a result, there remains the problem of how to implement circuitry to measure the resistance of many thousands, for example more than 80,000 detectors, within the size, power, and component restrictions placed upon an integrated circuit. The integrated circuitry must measure the resistance of each element of the array and format the results into a single data stream. The signal from each bolometer far exceeds the integrating capacity of a single practically sized integrated capacitor. It is therefor a motive of the invention to provide a bolometric focal plane array with an integrated signal processor that fits within a reasonable area, uses only the components available within the integrated circuit process, and dissipates a limited amount of power.

SUMMARY OF THE INVENTION

An infrared radiation detector apparatus of the present invention comprises a plurality of bolometric infrared detectors addressed by a plurality of column lines and a plurality of row lines. A plurality of electronic metal oxide semiconductor (MOS) switches each connects one of the plurality of bolometric infrared detectors between one of the plurality of row lines and one of the plurality of column lines. The plurality of bolometric infrared detectors and the plurality of electronic MOS switches are constructed on an integrated circuit. The bolometric infrared detectors may be micromachined into the integrated circuit.

In one aspect of the invention, the bolometric focal plane array of the invention comprises on-chip signal processing electronics and a plurality of bolometers. Each bolometer has an associated simulated detector. The simulated detector is used to test the on-chip electronics before the bolometer is created. This avoids the creation of bolometers on bad chips. The array is composed of 328×246 unit cells. Each unit cell contains a bolometer, associated electronics and a simulated detector. Each bolometer is accessible through a row and column scheme where the bolometers are found along a common column and addressed by separate row select lines. A row shift register selects the row and the bolometer signals are read out sequentially for each column. During a test mode the simulated detectors are individually accessed using a column shift register and a row shift register. The row shift register accesses a particular row and the column shift register accesses a particular column so that a particular single simulated detector output can be sensed. The chip has a temperature sensor to determine whether the chip has exceeded its operational temperature. Each column has a buffered direct injection amplifier providing a signal to a detector integration node capacitor. The detector integration node capacitor provides a signal to a comparator that receives an input from a ramp generator.

During the operation of the invention control states are reset, and the digital ramp generator is held at a low value to allow the comparator to proceed to dump unit charges off the bolometer. Off chip there is a memory that stores the value of the counter for each row and column unit cell. Also off chip is a memory that stores a preset for the detector integration node capacitor for each row and column unit cell. Detector protection circuitry times out the circuit when the row select signal is not received from external sources within a predetermined time.

Each unit cell comprises a low resistance switch, gated in response to the row select line, that switches a detector signal to the resistance measuring circuitry. A reset is also included. The array of resistance measuring circuitry has few channels compared to the number of detector elements, typically one circuit for each row or each column in the detector array. The control circuitry supplies appropriate signals to the switches and to the resistance measuring circuitry.

Other objects, features and advantages of the present invention will become apparent to those skilled in the art through the description of the preferred embodiment, claims and drawings herein wherein like numerals refer to like elements.

BRIEF DESCRIPTION OF THE DRAWINGS

To illustrate this invention, a preferred embodiment will be described herein with reference to the accompanying drawings.

DETAILED DESCRIPTION

Figure 1:
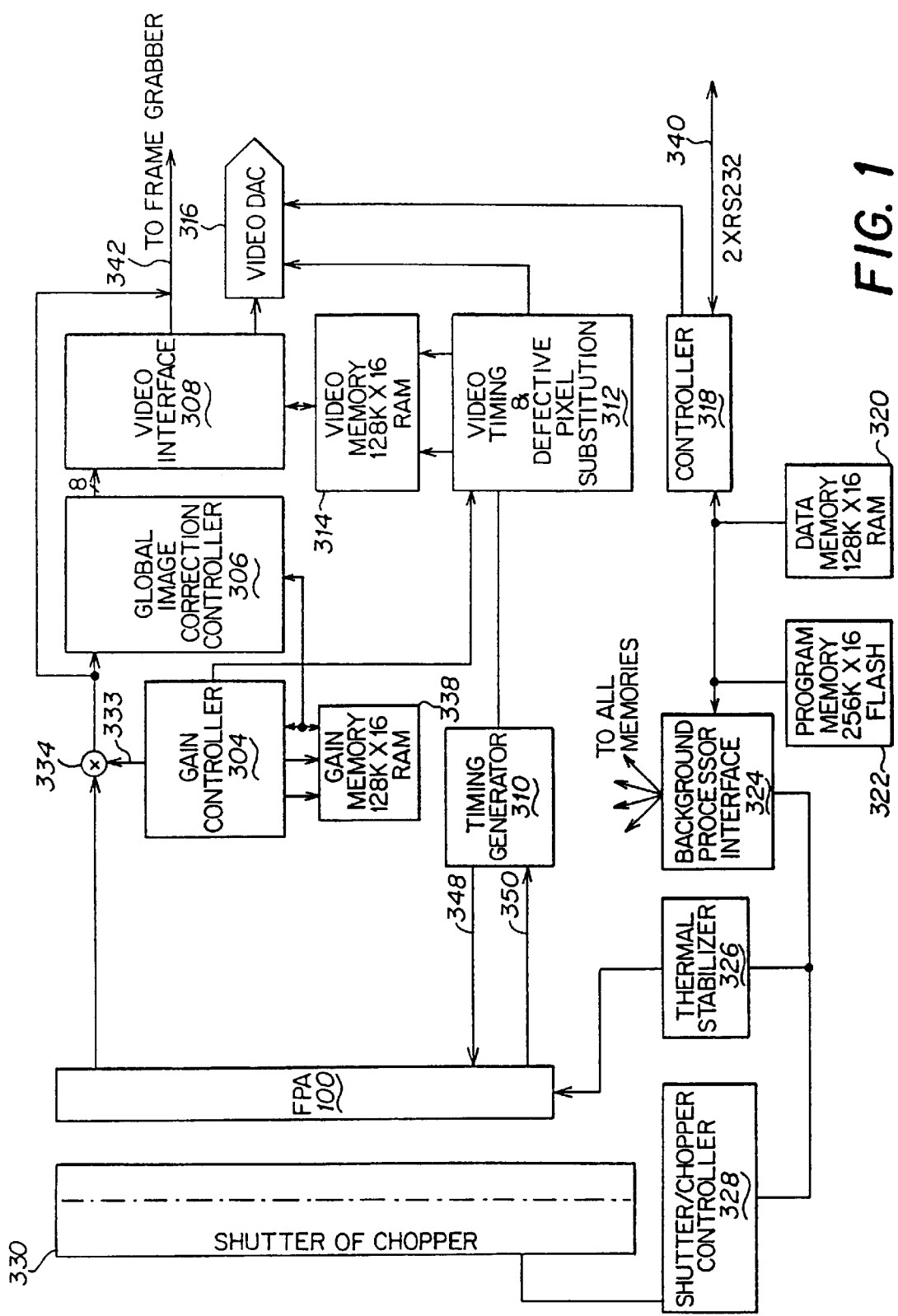
FIG. 1 shows a schematic block diagram of a digital offset correction apparatus as employed in one embodiment of the invention.

FIG. 1 shows a schematic block diagram of a system employing the focal plane array and integrated signal processor of the invention. A digital offset correction apparatus in the system comprises a shutter/chopper controller 328 coupled to control shutter 330. It will be appreciated that, depending upon the particular application, a germanium or opaque chopper or other equivalent optical device may be substituted for the shutter 330. The shutter 330 controls radiant energy entering the system. When the shutter is open, radiant energy impinges upon focal plane array (FPA) 100. The chopper 330 may be synchronized with the FPA frame rate. FPA 100 may advantageously be comprised of an integrated microbolometer focal plane array with associated control electronics. The integrated microbolometer focal plane array may be further comprised of pixel elements wherein each pixel element provides a signal representative of an amount of radiant energy absorbed by the pixel element. The FPA 100 may be operated in a silicon mode where the FPA 100 is not blocked by an obstruction. In the silicon mode, images may be obtained continuously.

A timing generator 310 provides two timing signals 348 and receives two clock signals 350 from the focal plane array 100. Timing generator 310 also provides timing signals to a video timing and defective pixel substitution controller 312. A gain controller 304 provides a gain adjust signal 333. Global image correction controller 306 provides an 8-bit signal to a video interface 308.

A video generator 316 is provided with video timing and the output of a controller 318. The video generator 316 may advantageously comprise a digital-to-analog converter as is known in the art. The controller 318 may advantageously comprise a microprocessor, such as, for example, a commercially available model 80C186EC type microprocessor or equivalent. A background processor interface 324 is provided with a program memory 322 and a data memory 320. In one embodiment of the invention, the program memory 322 may comprise a 256K×16 flash memory and the data memory 320 may comprise a 128K×16 RAM. The controller 318 may advantageously be connected through the background processor interface 324 to write or read data from each memory including the gain memory 338, the offset memory 336, and the video memory 314. Serial communications line 340 may be coupled to provide an external interface for the controller 318. Video output data is available from the video DAC 316, frame data is available to an external frame grabber on line 342. Thermal stabilization of the FPA 100 may be provided by thermal stabilizer 326.

The controller 318 interfaces the imaging system to external systems through a host microcomputer. The controller 318 also generates histograms, generates brightness and equalization curves, controls the chopper or shutter, generates reference image frame timing, performs memory and system diagnostics, monitors manual controls and switches, and controls the TE stabilizer 326. Timing generator 310 generates the FPA 100 clocks, the system clocks, and required timing signals.

Figure 2:
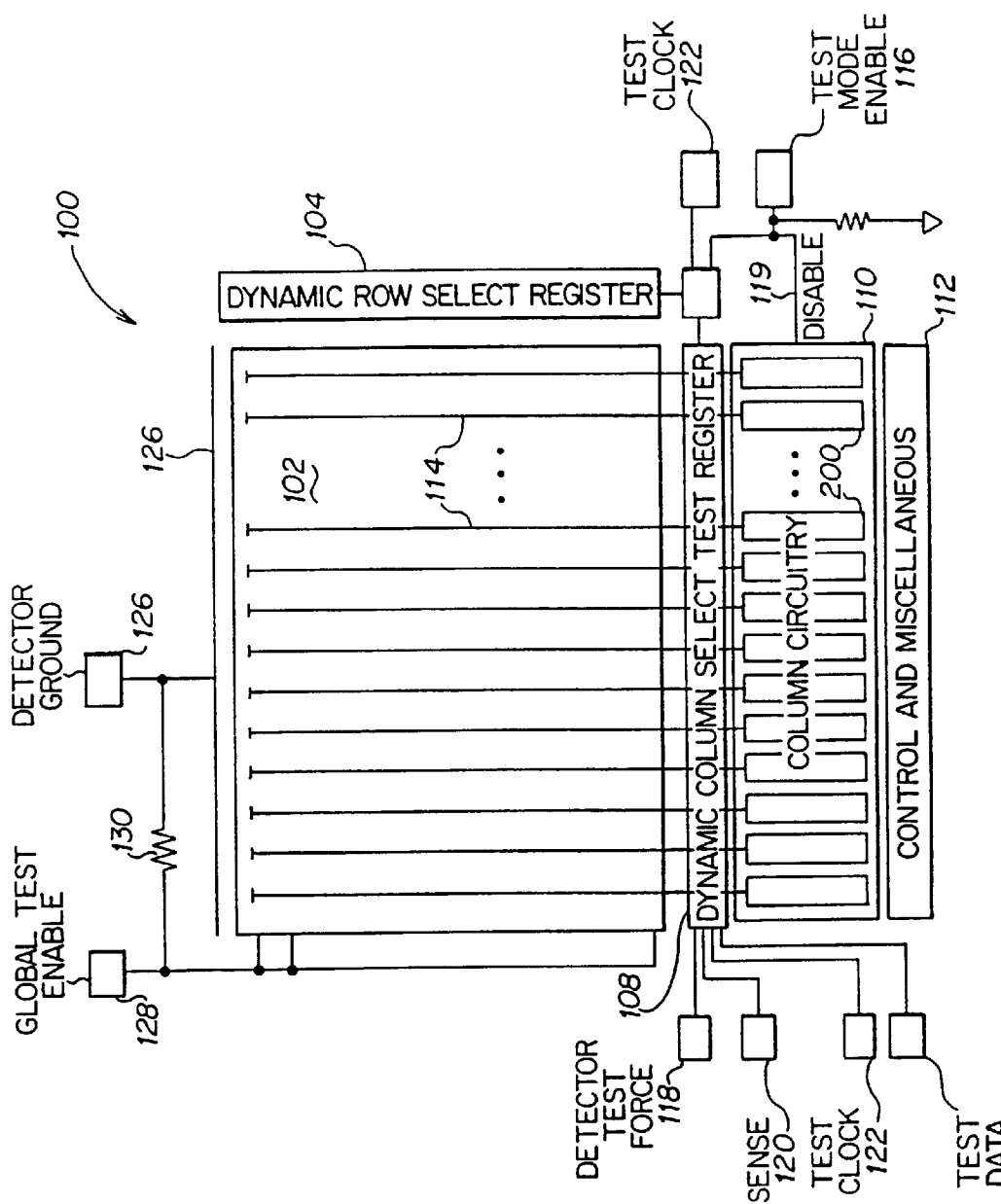
FIG. 2 shows a schematic diagram of a detector array of the invention.

FIG. 2 shows a schematic diagram of the array sensor of the invention. A microbolometer array 102 comprises the radiation sensing portion of the focal plane array 100. In one embodiment, the array 102 may comprise over 80,000 individual microbolometers. The electronic circuits associated with each microbolometer are shown in more detail in FIG. 3A. The detector ground 126 is distributed uniformly over the array 102. The array is arranged in a regular grid of microbolometers, by column line 114, addressed individually using a dynamic row select register 104 and column circuitry 110. The array 102 and the array's electronics may be tested during array production. The test clock 122, test data 124, test mode enable 116, global test enable 128 and detector test force 118 signals provide the control signals used to test the array. Column processing circuitry 200 is provided for each column line 114 in the array. The column processing circuity 110 is shown in more detail hereinbelow.

The array 102 has a distributed ground 126 and a distributed global test enable 128. The array 102 is addressed using a dynamic row select register 104 and in a test mode a dynamic column select test register 108. In operation, column circuitry 200 addresses any particular column. Control 112 controls the operation of the column circuitry. The column circuitry can be disabled with disable line 119.

Figure 3A:
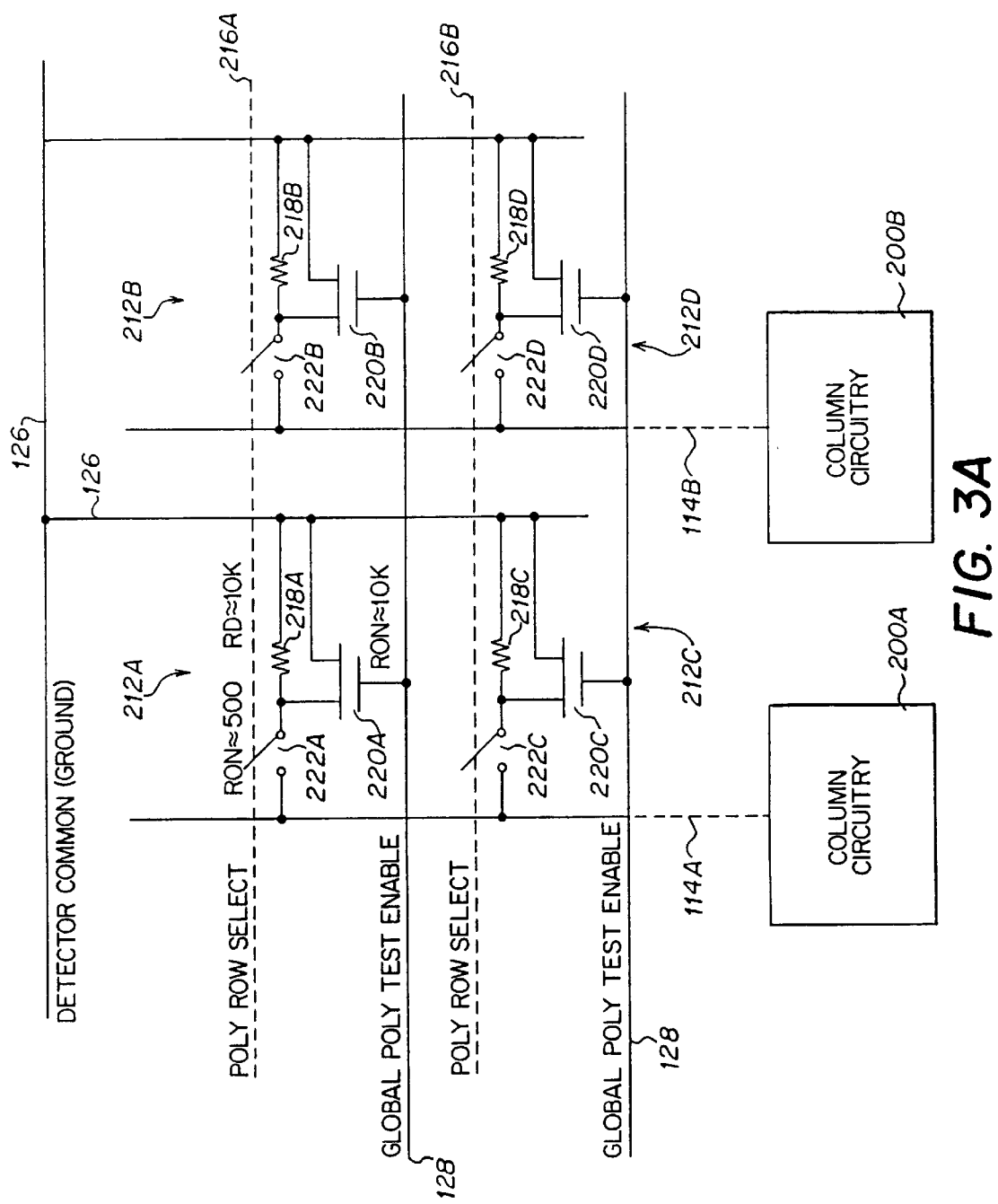
FIG. 3A is a circuit schematic diagram of one portion of a microbolometer array of the invention showing four example detectors and detector electronics.

FIG. 3A is a circuit schematic diagram of one portion of the microbolometer array of the invention showing an example of four detectors and associated detector electronics. The microbolometer array comprises a plurality of basic unit cells including multiplexer test transistors. In one embodiment the microbolometer focal plane array may comprise a 328×246 matrix of unit cells having 328 column circuits. The detector common ground 126 is connected to one side of bolometers 218A, 218B, 218C and 218D and unit cells 212A, 212B, 212C and 212D, respectively. The bolometers are connected in parallel with test transistors 220A, 220B, 220C and 220D. The "on" resistance of transistors 220A, 220B, 220C and 220D approximates that of the bolometers 218A, 218B, 218C and 218D. Thus, the test transistors can be used to provide a signal that emulates the bolometer signal. The emulated signal may be used to test the multiplexer circuitry before the bolometers are created. Such testing may result in less expensive manufacture because defective chips may be thus identified prior to final fabrication. Switches 222A, 222B, 222C and 222D switch the bolometer or test transistor signal in response to row select lines 216A and 216B. In a test mode the test transistors may be activated by the global test enable 128 and each individual row may be selected using one of the row select lines. An output is available at each column circuit 200A and 200B. In a test mode, the column circuitry 200A and 200B is bypassed and addressed with a column multiplexer.

Figure 3B:
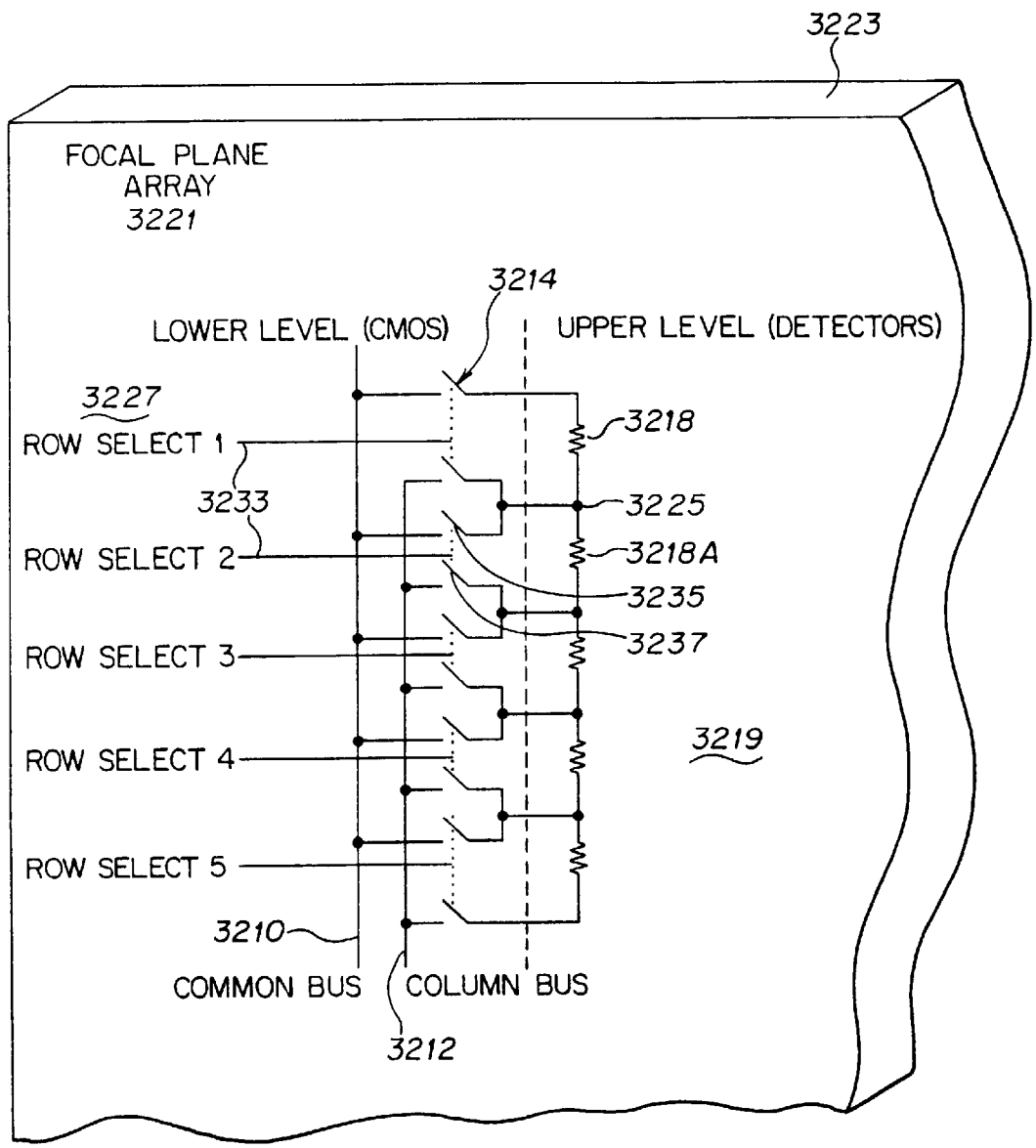
FIG. 3B is a circuit schematic diagram of an alternate embodiment of a portion of a microbolometer array of the invention showing a plurality of detectors and detector electronics.

Refer now to FIG. 3B where a circuit schematic diagram of an alternate embodiment of a portion of a microbolometer array of the invention showing a plurality of detectors 3218 and detector electronics is shown. Each of the plurality of detectors 3218 is constructed on an upper level 3219 of a microbolometer focal plane array 3221 comprising an integrated circuit fabricated on a semiconductor chip 3223. A series of switches 3214 are constructed on a second level 3227 of the semiconductor chip 3223. The switches 3214 may advantageously comprise CMOS switches. The switches 3214 are connected to be activated in pairs where the switches are connected at a first terminal to a common bus 3210 and at a second terminal to one end of the detector. Row select lines 3233 operate to activate a pair of switches to select one of the detectors. The selected detector's output may then be sensed on a column bus 3212. For example, in operation, row select 2 responds to a control signal to activate a switch pair comprising switch 3235 and switch 3237, thereby allowing a signal from detector 3218A to be transmitted to the column bus 3212. Note that in this configuration the number of connections required to connect the column of detectors to the switching level may be advantageously reduced to one more than the number of detectors.

Figure 4:
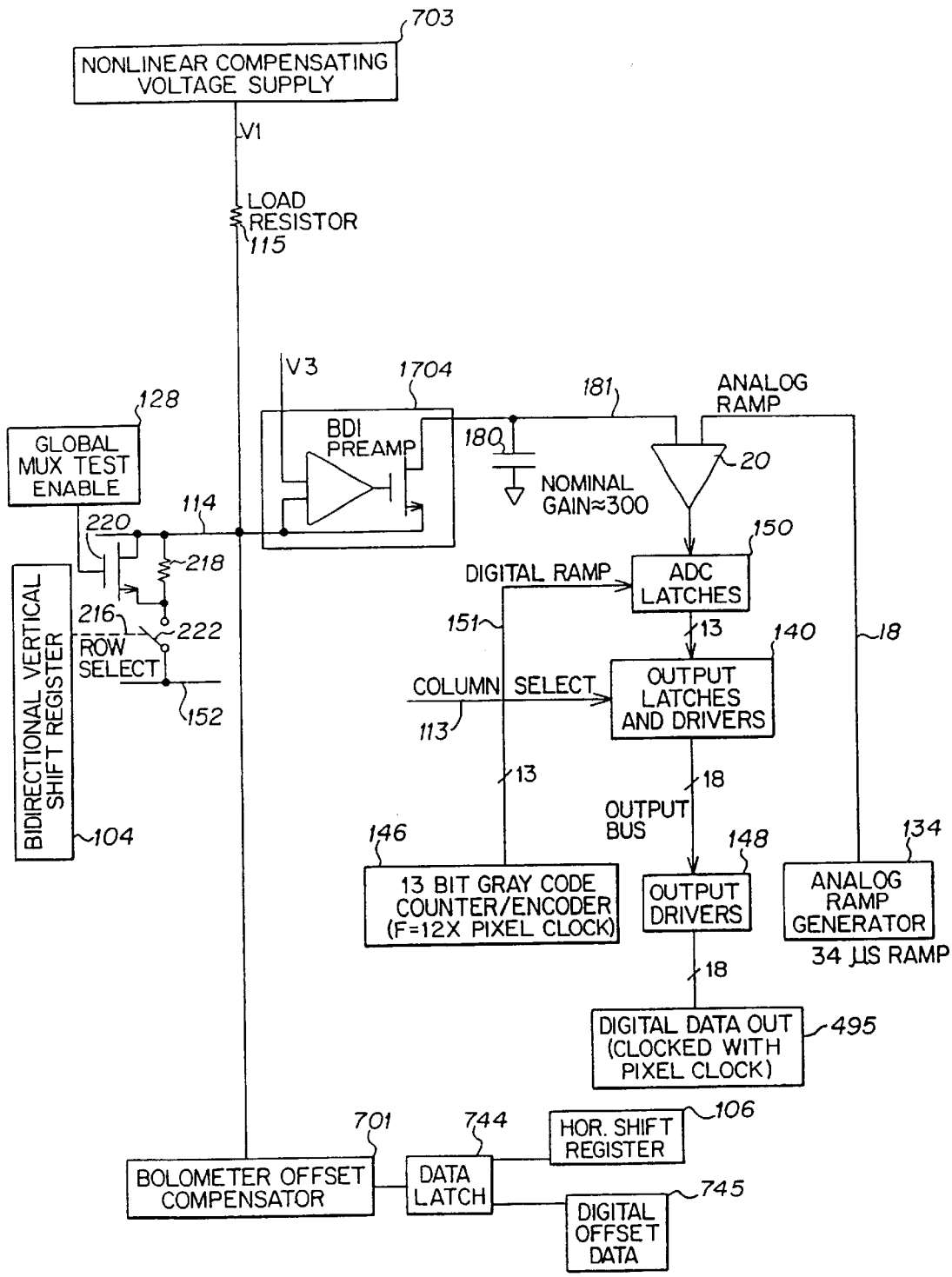
FIG. 4 shows a circuit schematic diagram of a microbolometer focal plane array processing circuitry of the invention.

Refer now to FIG. 4 which shows one example of microbolometer array processing circuitry of the invention. The processing circuitry may advantageously be integrated onto a single integrated circuit with the focal plane array using, for example, MOS technology. A bidirectional vertical shift register 104 functions as the row select for the array. Row select line 216 activates switch 222 to either select the signal from the bolometer 218 or the test transistor 220. A global test enable 128 activates all test transistors when engaged. The column line 114 is biased by a supply 703. The column line 114 is sensed by a buffered direct injection (BDI) circuit 1704 having a preamplifier stage and an output transistor stage. The integration capacitor 180 integrates the signal on the column sense line 181. In one embodiment of the invention the integration capacitor may have an integration time of about 29 microseconds. Comparator 20 compares an analog ramp signal 18 to the integrated signal on column sense line 181.

The ramp generator 134, shown in more detail below, provides the comparator with an analog ramp signal 18. The ramp signal, in one example, may be a 34 µs ramp that may nominally range between about 5 volts to 10 volts. The comparator 20 provides a binary signal to the analog-to-digital latches 150. A digital ramp signal 151 is provided from a 13 bit gray code counter/encoder 146. The 13 bit gray code counter/encoder 146 may operate using a frequency equal to 12 times the pixel clock, using four phases of the 12x_clock for 13 bit resolution. The digital ramp signal and the analog ramp signal are coordinated so that they start and end at the same time.

A column select line 113 provides the addressing for the output latches and drivers 140. Depending on the column selected, the output latches and drivers provide the count of the analog-to-digital converter latches 150, enabled by comparator 20. The output drivers 148 provide digital data 495 to the off focal plane circuits. The digital data 495 may be clocked with the pixel clock.

In the example embodiment, a bolometer offset compensator 701 is connected in parallel with the detector elements. It will be understood that the bolometer offset compensator and its control circuits are replicated for each column of detectors in the array. The embodiment shown in FIG. 4 optionally includes a nonlinear compensating voltage supply 703 coupled to load resistor 115. The load resistor 115 is connected to the bolometer offset compensator 701. One embodiment of the bolometer offset compensator 701 is described in more detail below with reference to FIG. 8. The bolometer offset compensator 701 is coupled at a first terminal to load resistor 115 and at a control input to data latch 744. The data latch 744 is described in more detail below with reference to FIG. 9. Digital offset data 745 is provided to the data latch 744. The digital offset data represents the offset to be applied to each row and column bolometer signal on column line 114. A BDI preamplifier 1704 amplifies the offset bolometer signal for further processing.

Figure 5:
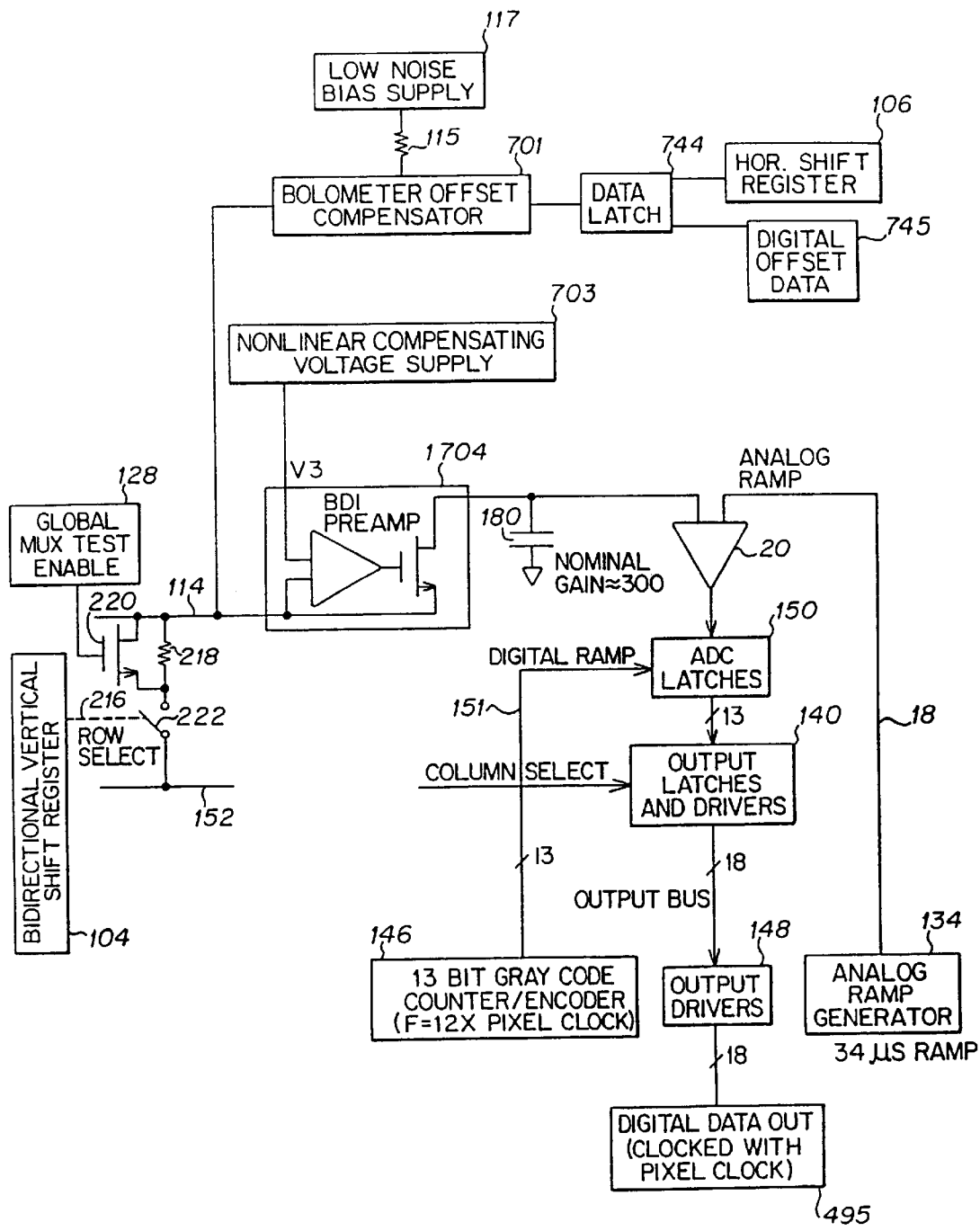
FIGS. 5 and 6 show alternate examples of microbolometer focal plane array processing circuitry of the invention embodied, for example in an integrated circuit, employing a bolometer offset compensator.

Refer now to FIG. 5 which shows another alternate example of microbolometer array compensation circuitry of the invention employing a bolometer offset compensator 701 connected in series with the load resistor 115, and the detector elements. Supplying a voltage bias to the bolometer offset compensator 701 is a low noise bias supply 117. It will be understood that the bolometer offset compensator and its control circuits are replicated for each column of detectors in the array. The alternate embodiment shown in FIG. 5 optionally may include a nonlinear compensating voltage supply 703 coupled to one input of a BDI preamplifier 1704. The other elements are connected in a manner similar to that described above.

Figure 6:
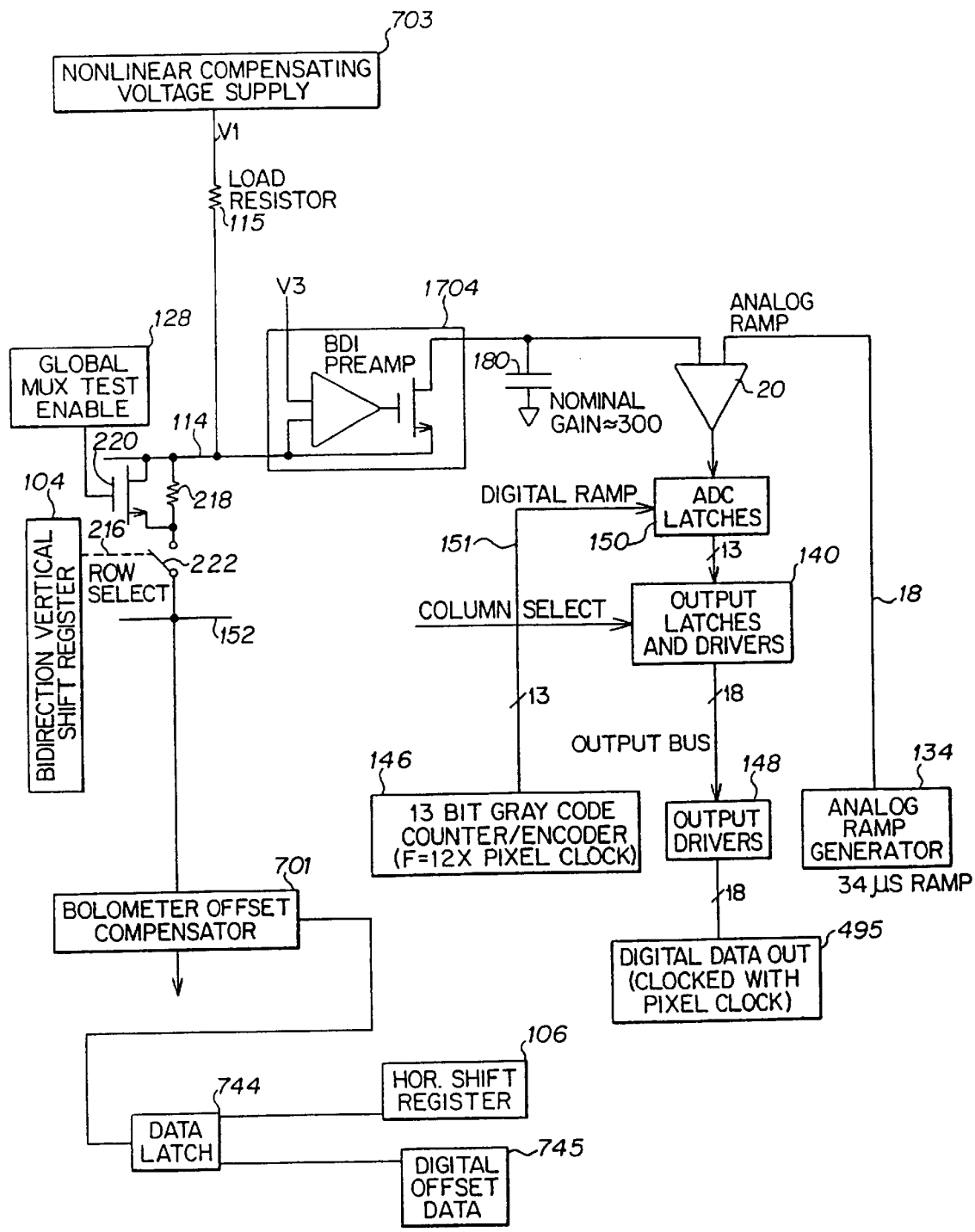

Refer now to FIG. 6 which shows another alternate example of microbolometer array compensation circuitry of the invention employing a nonlinear compensating voltage supply 703 coupled to load resistor 115. The other elements are connected in a manner similar to that described above with respect to FIG. 4. The operation of the nonlinear compensating voltage supply is explained in more detail hereinbelow.

Figure 7:
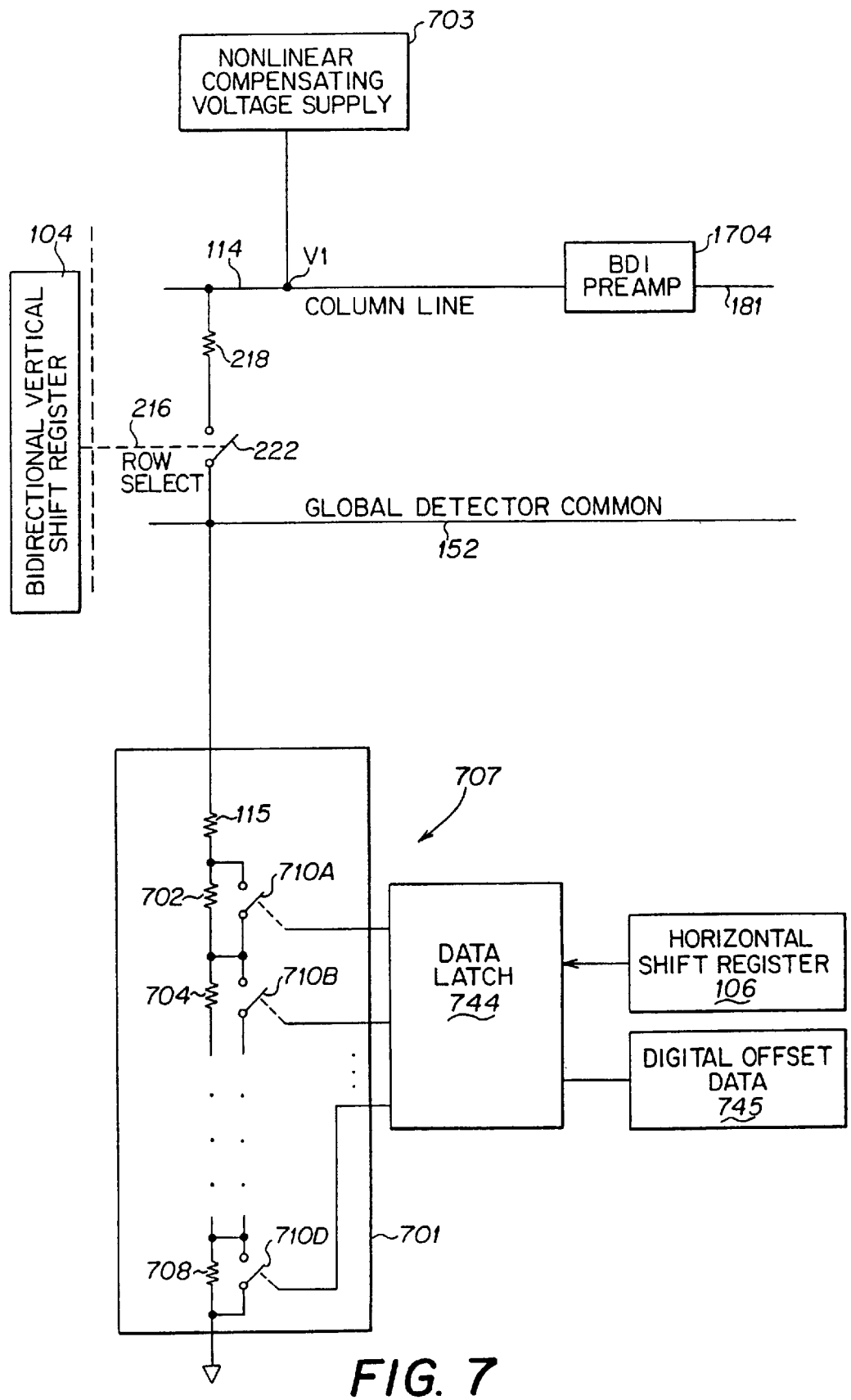
FIG. 7 shows a alternate embodiment of a bolometer offset compensator circuit as contemplated by an alternate embodiment of the invention.

Now refer to FIG. 7 which shows an alternate embodiment of a bolometer offset compensator circuit as contemplated by the present invention. As described above, each column of the focal plane array is coupled to a bolometer offset compensator 701. Thus the bolometer offset compensator 701 and associated circuits, designated by arrow 707, are replicated on the FPA integrated circuit chip for each of the M columns. The bolometer signal on column line 114 is selected with row select line 216 to connect to BDI preamplifier 1704. The signal from the bolometer on column line 114 is the signal being compensated by the bolometer offset compensator 701. In the example shown, the bolometer offset compensator 701 comprises first through sixth compensating resistors, some of which are shown for illustrative purposes as compensating resistors 702, 704, and 708, each individually coupled to a plurality of switches 710A, 710B and 710D. The plurality of switches are coupled and controlled by the outputs of, for example, a six bit data latch 744. The six bit data latch 744 is enabled by the horizontal shift register 106. Digital offset data 745 selects the particular resistor combination through data latch 744. In one embodiment of the invention, the first through sixth compensating resistors may have values in the nominal range of 1200 ohms to 8200 ohms and are coupled to a load resistor 115 of about 145 kohms, for example. The embodiments shown herein are meant by way of illustration, not limitation, and other equivalent values and combinations of compensating resistances or equivalent circuitry may be used without departing from the spirit and scope of the invention. In one embodiment nonlinear compensating voltage supply 703 supplies voltage to the bolometer offset compensator 701.

Figure 8:
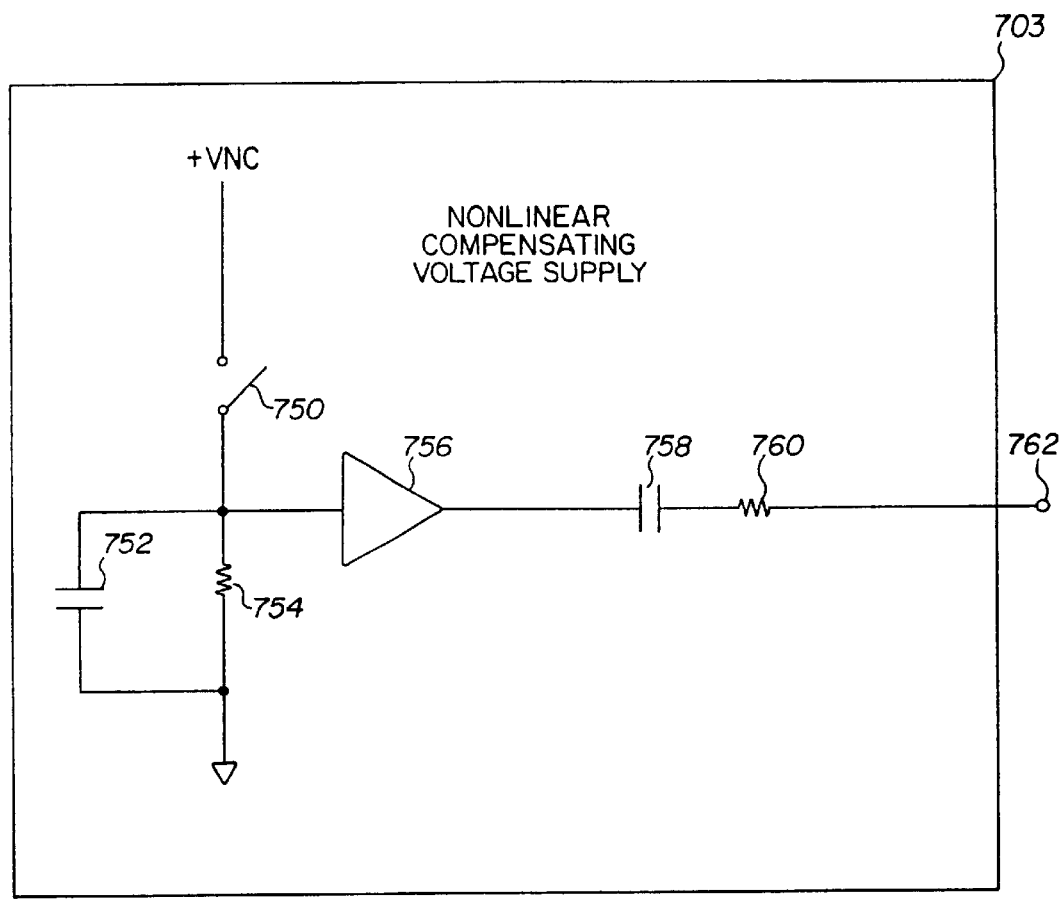
FIG. 8 schematically shows one example of a nonlinear compensating voltage supply as contemplated by an alternate embodiment of the invention.

Now refer to FIG. 8, which schematically shows one example of a nonlinear compensating voltage supply 703 as contemplated by an alternate embodiment of the invention. The nonlinear compensating voltage supply comprises a switch 750 connected to a capacitor 752 that is connected in parallel with resistance 754. When closed, switch 750 applies a voltage, VNC, to amplifier 756. Amplifier 756 may advantageously comprise a unity gain amplifier having an output 762 through an output capacitor 758 connected in series to an output resistance 760. Referring again to FIG. 4, the output 762 may be connected to node V1 or, in an alternate embodiment, to node V3 so as to control the BDI preamplifier. The switch 750 may advantageously be activated synchronously with the detector row select. As will be appreciated by those skilled in the art having the benefit of this disclosure, the amplifier 756 may comprise a unity gain inverting operational amplifier or a unity gain non-inverting operational amplifier depending upon the integrated circuit technology for any specific application.

Figure 9:
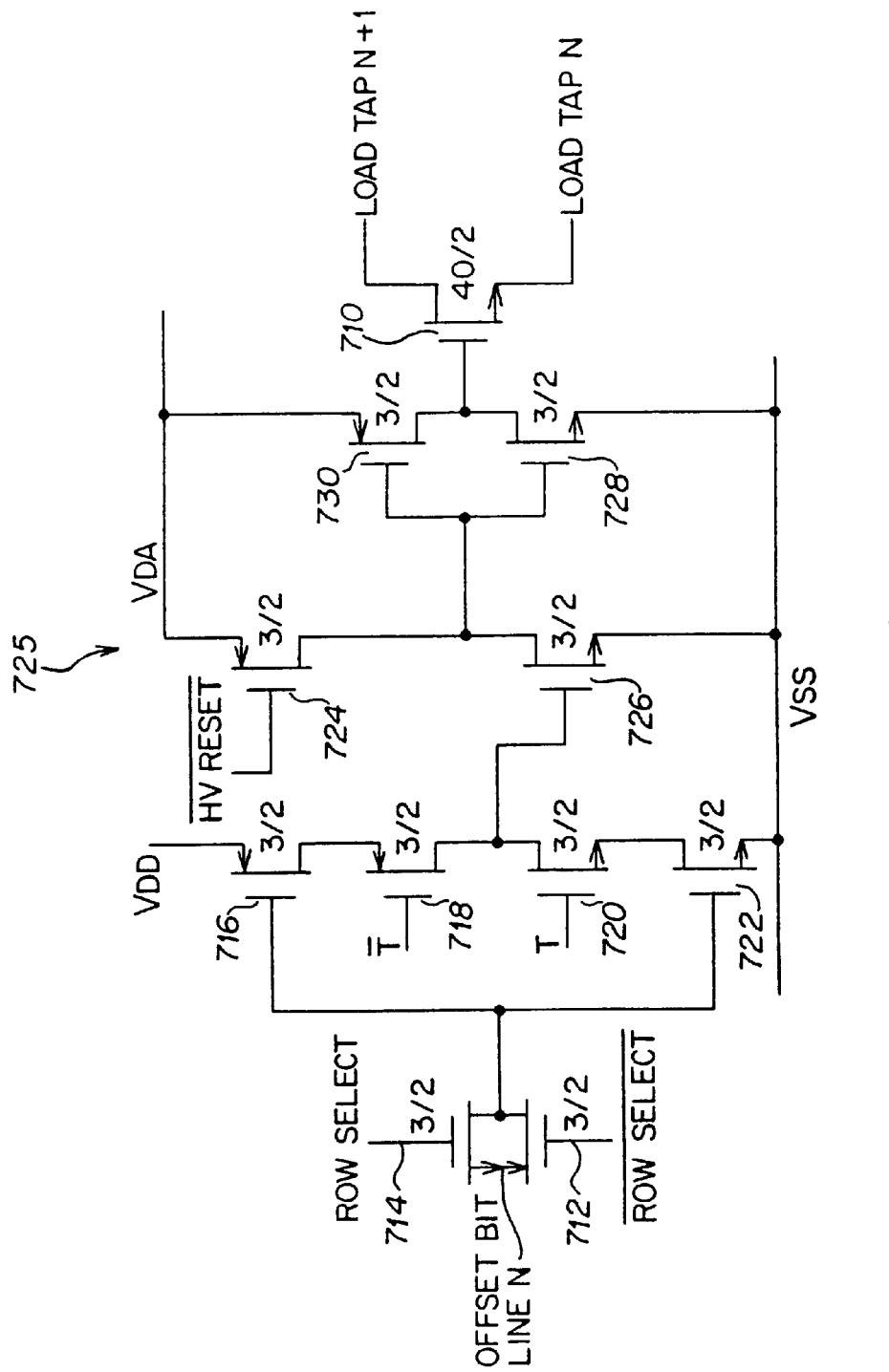
FIG. 9 shows an example of a one bit latch used in a six bit data latch as employed in an alternate embodiment of the invention.

Refer now to FIG. 9 which shows an example of a one bit latch 744A used in the six bit data latch 744. Bit latch 744A may be coupled to a level shifter circuit 725 for changing the voltage level from the input to the output. The level shifter 725 may be advantageously configured to decrease n-channel on resistance. The circuit of FIG. 9 may advantageously be duplicated a plurality of times for each compensating resistor. In one example where the bolometer offset compensator 701 employs six compensating resistors, identical data latch circuitry may advantageously be fabricated six times for each of M columns on the FPA chip. In a preferred embodiment, the data latch 744 comprises complementary metal oxide semiconductor (CMOS) transistors.

At the input, each bit latch 744A comprises row select transistors 714, 712 configured to dynamically latch and select the Nth offset bit. Transistor 714 is controlled by a row select output from the horizontal shift register 106. Transistor 716 is controlled by a NOT row select output from the horizontal shift register 106. Transistors 716, 722 operate as a second dynamic latch. Transistors 718 and 720 drive transistor 726 in response to control signals T and NOT T which transfer the state of the n offset bit to transistor 726 when activated. The NOT HV reset signal resets the output of transistor 724 while the transfer signals T and NOT T are inactive. After reset the transfer signals active and transistors 718 and 720 drive transistor 726. Transistors 728 and 730 act to drive transistor 710 in response to the output of transistor 726. At the output, a switching transistor 710 controls selection of a compensating resistor by shorting Load tap N to Load tap N+1. The plurality of switches 710A–710D comprise switching transistors 710 in the example above. The first latch may be biased at a first voltage Vdd for operating transistors in the range of 3×2 microns in area, while a second voltage Vda, substantially higher than Vdd, may be selected to operate transistor 710. Transistor 710 may comprise semiconductor material having an area of about 40 by 2 microns.

Having described the elements of the bolometer offset compensator circuitry it will be helpful to the understanding of the invention to now describe the operation of the bolometer offset compensator circuitry. By way of farther background, microbolometer focal plane arrays typically require electronic circuits with a very large dynamic range in order to simultaneously accommodate both detector non-uniformities and very low signal levels. A dynamic range in excess of 1 million to 1 is typical. Electronic circuit switches can meet this difficult requirement, especially when applicable to large focal plane arrays, and provide a significant benefit and a practical application of microbolometer technology. In the embodiment shown in FIG. 7, the nonlinear compensating voltage supply, when employed, may preferably be an off-focal plane nonlinear compensating voltage supply connected to on-focal plane circuits comprising the bolometer detectors, load resistor, pre-amplifier and compensating resistors. When a voltage, V1, is applied, a current flows through the detector column line 114, load resistor 115 and at least one compensating resistor as selected by opening one or more of the plurality of switches 710A–710D. In some embodiments, load resistor 115 may not be required. Voltage V1 is set by a BDI preamplifier 1704 and is nominally the same voltage for each of M detector circuits. The current which flows into the preamplifier represents the signal current. To compensate for differences in detector resistance where the detector resistance may vary significantly from detector to detector the compensating resistors may be employed. If such compensating resistors are not employed, the preamplifier circuit must have a significantly increased dynamic range in order to accommodate not only the useful signal current, but also significant additional current resulting from detector resistance variations.

As current is applied to the bolometer detectors, $I^2R$ heating (that is, heating in proportion to the square of the current through the resistance) raises the temperature of each detector. The increased temperature results in a change in detector resistance, thereby increasing the input dynamic range requirement of the BDI preamplifier 1704. The external nonlinear compensating voltage supply 703 senses the current change at node V1, and provides a nonlinear voltage precisely compensating for $I^2R$ heating induced changes in preamplifier current. In this way, the nonlinear voltage also reduces the dynamic range requirement of the preamplifier circuit to a level that may be readily achieved in an electronic circuit integrated onto the focal plane.

Figure 10:
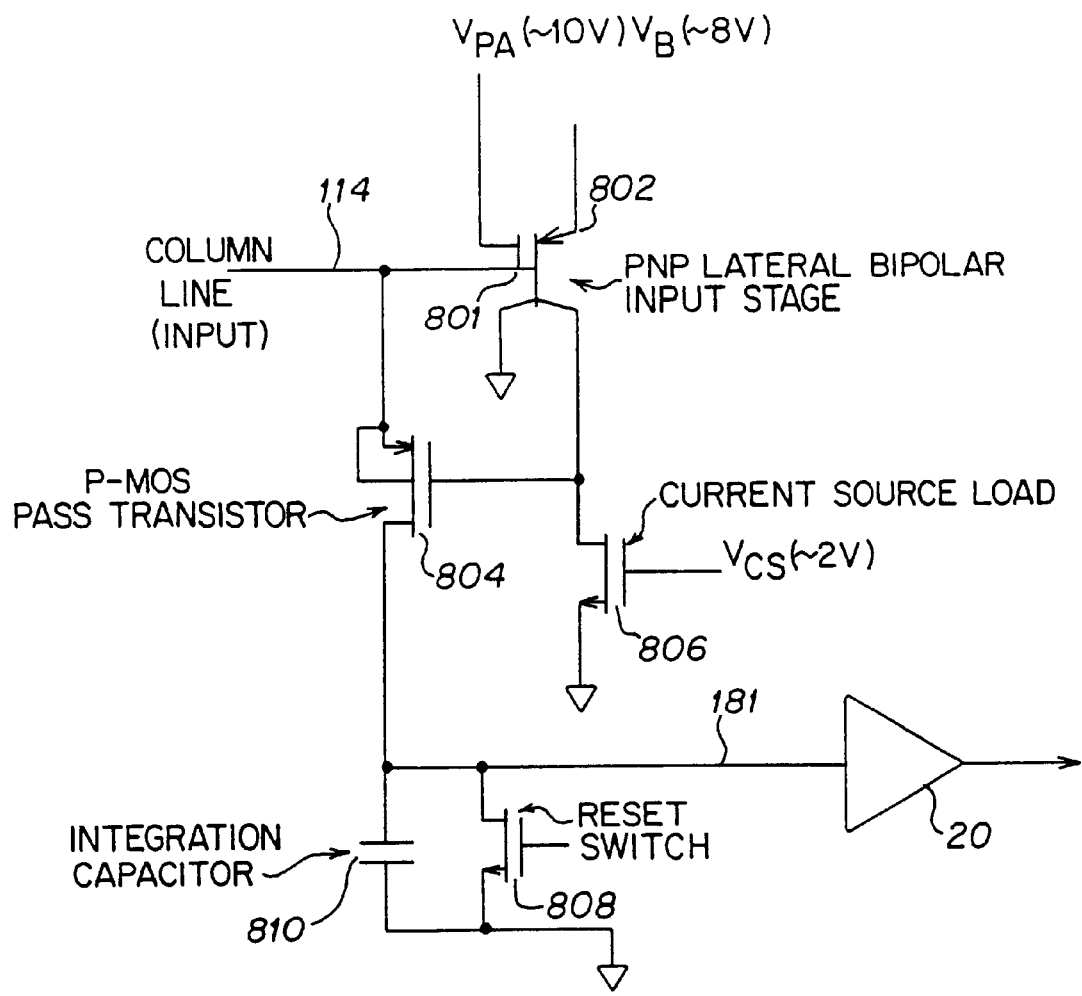
FIG. 10 shows an example of a buffered direct injection (BDI) preamplifier employing lateral bipolar transistors.

Referring now to FIG. 10, there shown is an example of a BDI preamplifier employing lateral bipolar transistors. The BDI preamplifier comprises, for example, a PNP lateral bipolar input stage 802, a current source load 806, a P-MOS pass transistor 804, an integration capacitor 810 and a reset switch 808. The column line 114 may be connected to the PNP lateral bipolar input stage at a gate 801. The gate 801 may also be coupled to a suitable voltage, VPA, where VPA may be about 10 volts. An emitter of the input stage 802 may be coupled to a second voltage, VB, of about 8 volts. The current source load 806 may be coupled to a collector of the input stage 802. The column sense line 181 may then be coupled to the integration capacitor 810 where the integration capacitor 810 may be reset by reset switch 808. Reset switch 808 may also be implemented as a lateral bipolar ransistor. Lateral bipolar transistors are discussed in more detail in an article by Holman and Connelly entitled "A Compact Low Noise Operational Amplifier for a 1.2 μm Digital CMOS Technology," IEEE Journal of Solid State Circuits, Vol. 30, No. 6, June 1995, which is incorporated herein by reference.

Figure 11:
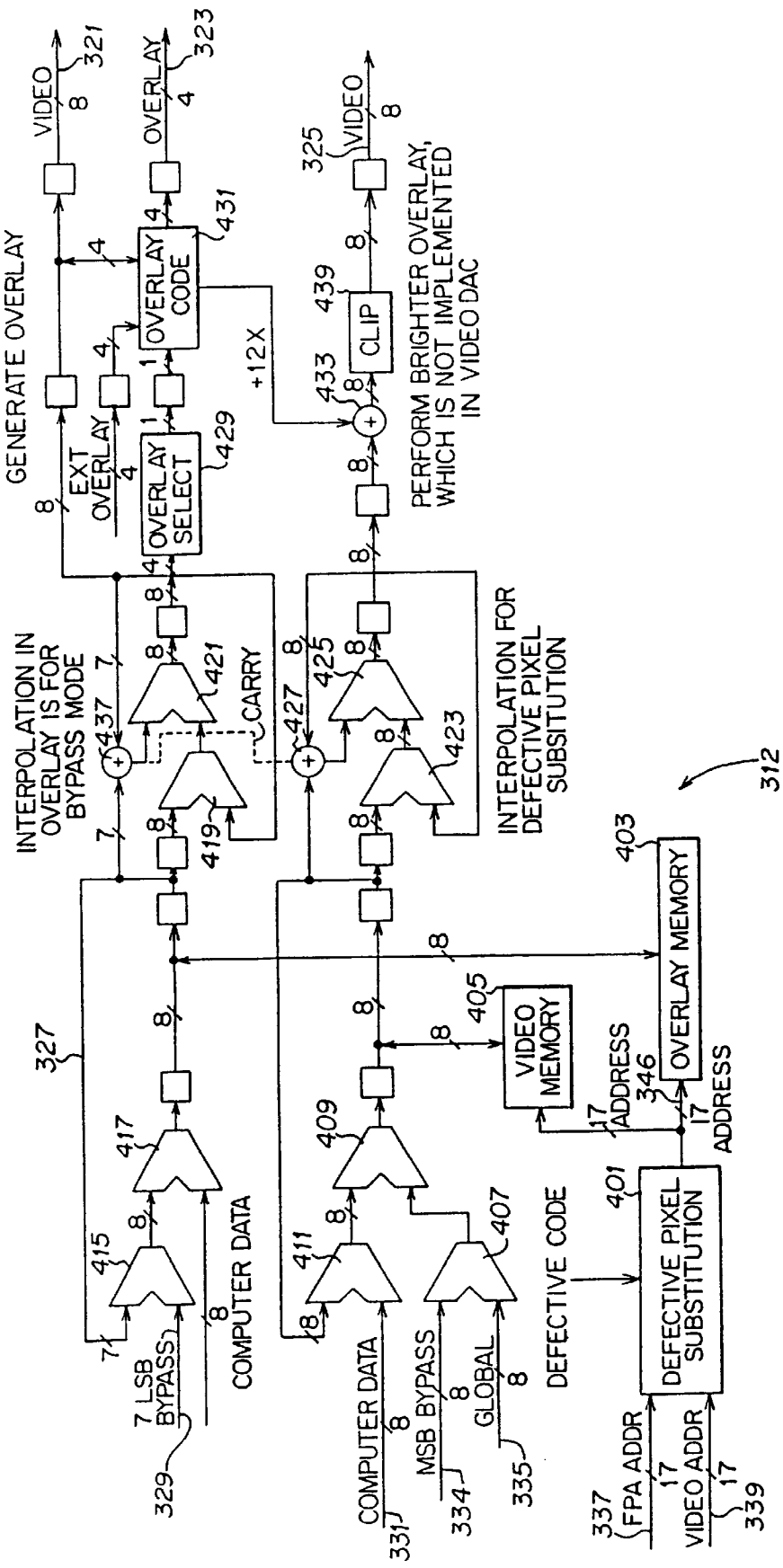
FIG. 11 shows a video processor of the invention.

Refer now to FIG. 11 which shows the video processor 312 of the invention. The video processor provides an 8-bit video signal, a 4-bit overlay signal and a bright overlay signal. The 8-bit video signal is provided by the summation of the output of multiplexer 421 with the output of multiplexer 417. Multiplexer 417 computes 8-bit data from the focal plane array processing system with a feedback signal through multiplexer 415 to provide a 7-bit least significant bit bypass. The summation node 437 provides multiplexer 421 with a summed input. Multiplexer 421 also receives the output of multiplexer 419. Multiplexer 419 receives the output of the overlay memory 403. Defective pixel substitution is implemented by multiplexer 425 and multiplexer 423 with multiplexer 423 inputting 8-bits of data to multiplexer 425 which receives the output of summation node 427. Summation node 427 sums the output of multiplexer 425 as an input with data from the video memory 405. Defective pixel substitution processor 401 provides the 17-bit address for the video memory where the defective pixel data is substituted. An 8-bit computer signal is fed to multiplexer 411 which also receives feedback data from multiplexer 409. The output of multiplexer 411 is multiplexed in multiplexer 409 with the eight most significant bits multiplexed with the eight most global bits through multiplexer 407. The defective pixel substitution processor 401 provides a 17-bit address to the overlay memory 403 which provides data to multiplexer 419 as described above. Clipping processor 439 clips the output of summation node 433 which provides an overlay signal from overlay processor 431 and the output of the defective pixel substitution circuitry produced by multiplexer 425. Globally scaled data from the focal plane array is provided through multiplexer 407 and gain corrected data is provided to multiplexer 415.

Figure 12:
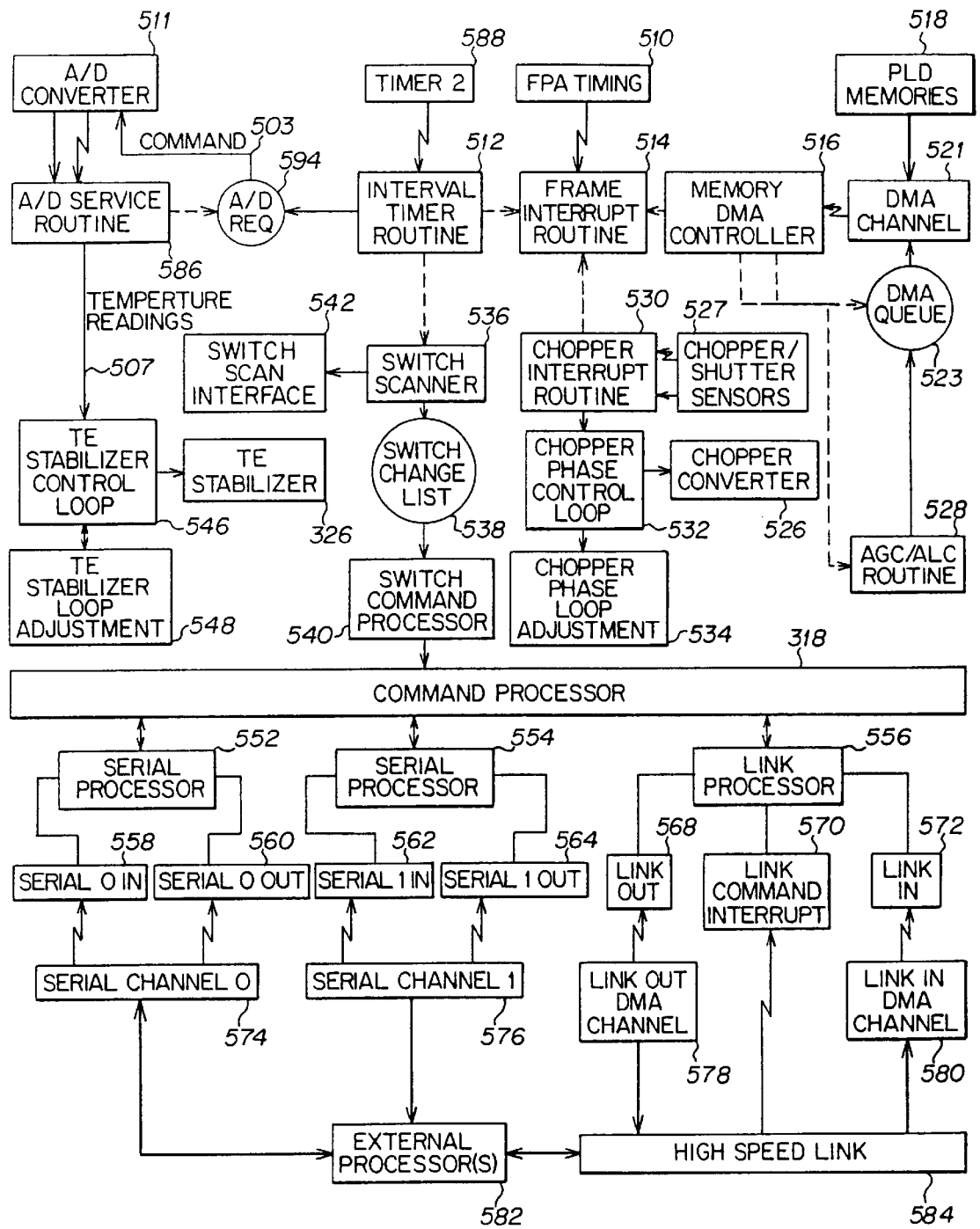
FIG. 12 shows a schematic of an interface routine and an interface structure for a command processor as employed in one embodiment of the invention.

Refer now to FIG. 12 which shows a schematic of the interface routine and the interface structure for the command processor of the invention. The controller 318 has a first serial processor 552 and a second serial processor 554 interfaced to serial input/output (I/O) port.

A high speed link 584 interfaces to an external processor 582. The external processor 582 controls serial link 1-576 and serial link 0-574. High speed link 584 interfaces through memory by DMA channel 578 and DMA channel 580. The DMA channel 578 is a output channel that interfaces to link controller 568 which interfaces to link processor 556. The high speed link also communicates to a link command interpreter 570. The link processor 556 accepts data from the high speed link 584 through link controller 572 through DMA channel 580. Link processor 556 interfaces to the controller 318.

FPA timing controller 510 provides frame interrupt routine 514 with timing data. Timer_2 588 provides signals for the interval timer routine 512 which schedules the digital-to-analog converter requests 594. The digital-to-analog converter request command 503 is provided to the analog-to-digital converter 511 which operates the analog-to-digital converter service routine 586. Temperature readings 507 are provided to TE stabilizer control 546. The TE stabilizer 326 is controlled by the TE stabilizer control 546. The TE stabilizer 326 has a TE stabilizer loop adjustment 548. Switches to control the device have an interface 542 which is scanned by switch scanner 536. The timer routine provides polling for the switch scanner as well as the frame interrupt routine 514 and the analog-to-digital request 594. Switch scanner provides data to the switch change list 538 which provides data to the switch command processor. The chopper interrupt routine 534 receives data from the chopper shutter sensors 527. The chopper phase control loop 532 is controlled by the chopper routine 530. The chopper converter 526 is controlled by the chopper phase control loop 532. The chopper phase loop is adjusted in 534. The DMA memory controller 516 provides service for DMAQ 523. The DMA channel 521 accesses the system memory 518. The automatic gain control routine 528 interfaces to the memory through the DMAQ 523 controlled by DMA controller 516.

Figure 13:
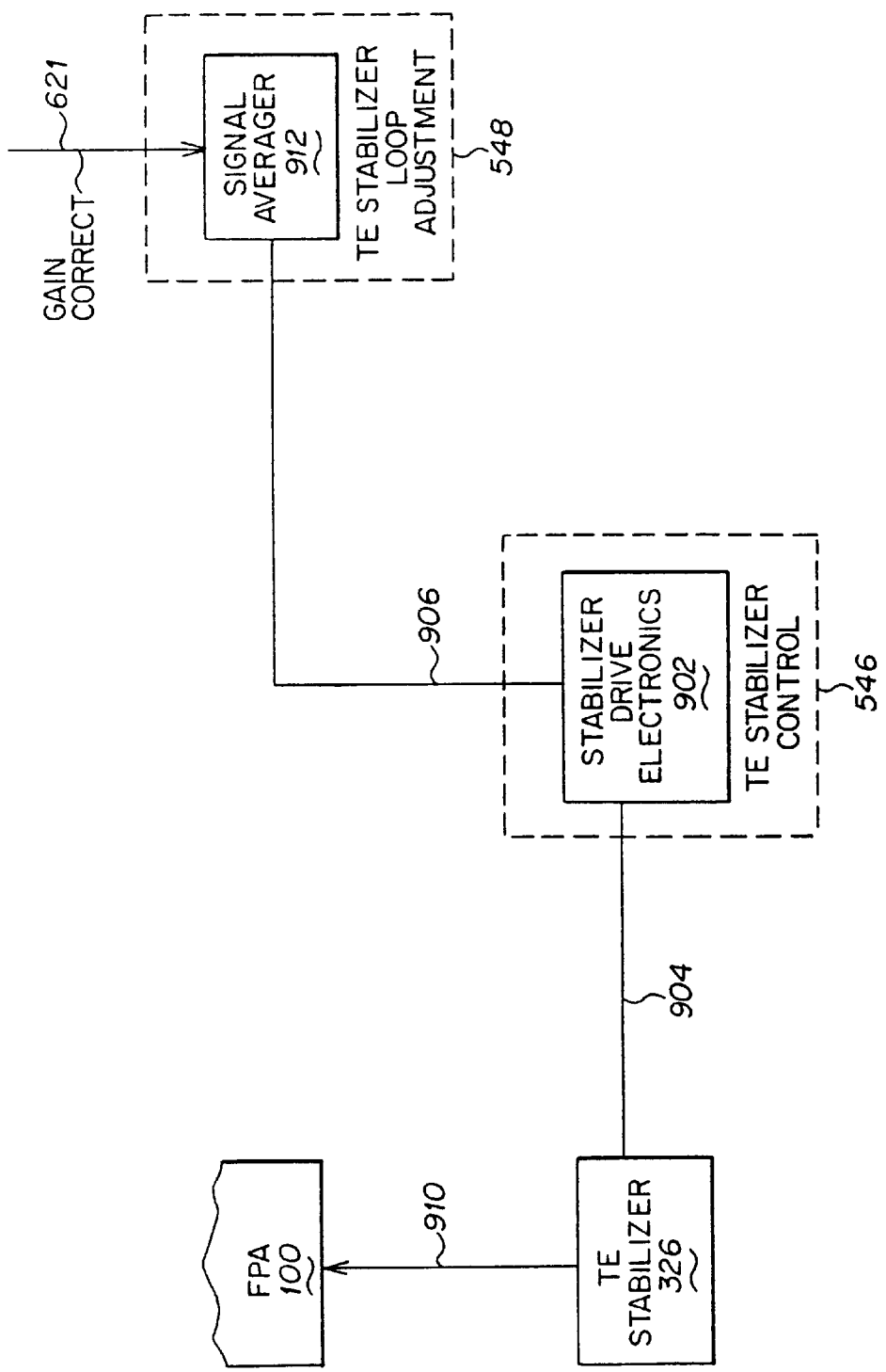
FIG. 13 schematically shows a block diagram of one example of a thermal stabilization apparatus for a microbolometer focal plane array as embodied in accordance with the present invention.
Figure 14:
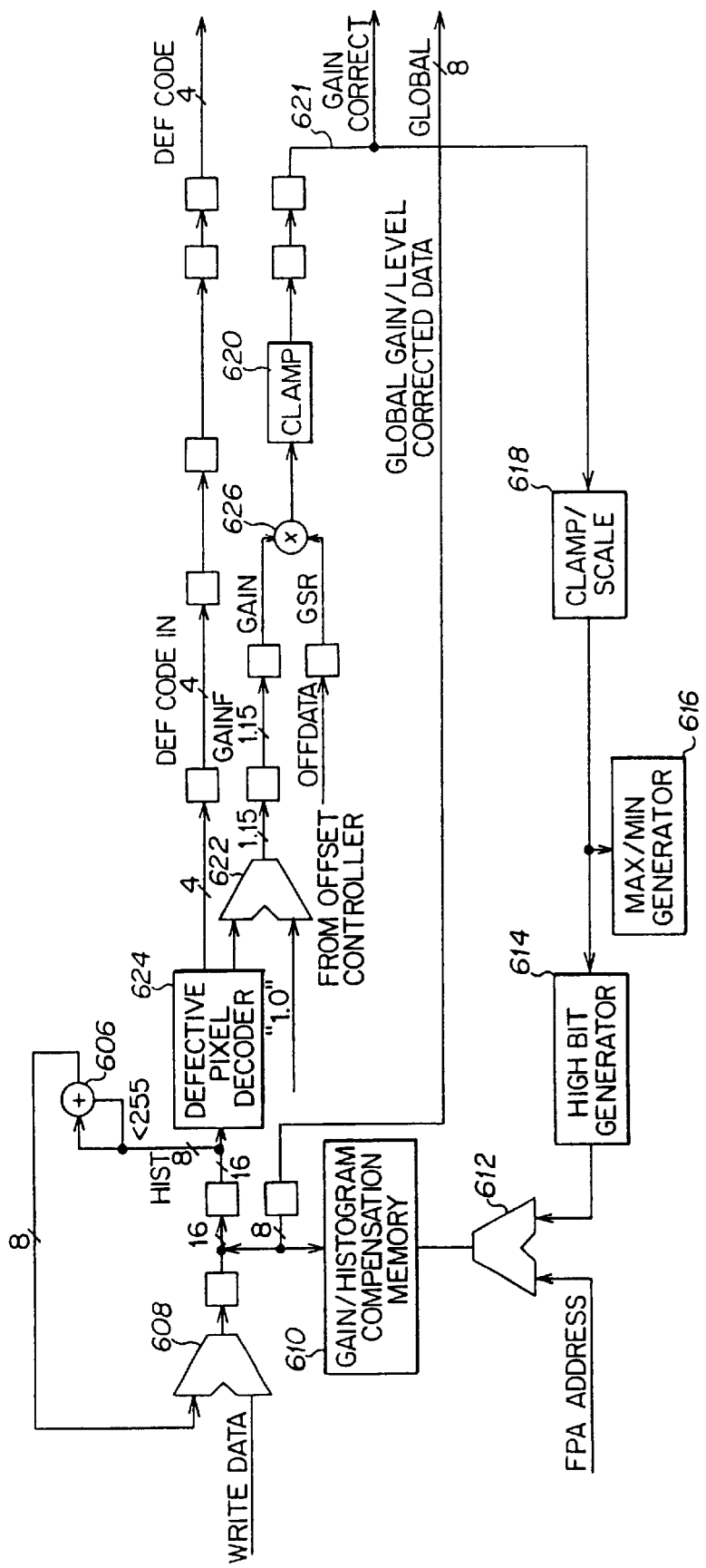
FIG. 14 schematically shows a gain correction image correction controller as employed in one embodiment of the invention.

Now referring to FIG. 13, there shown is a block diagram of one particular example of a thermal stabilization apparatus for a microbolometer focal plane array as embodied in accordance with the present invention. The apparatus comprises the microbolometer focal plane array 100 for providing temperature data from each of a plurality of microbolometers. As described above, the data from FPA 100 may be processed to produce a gain corrected signal 621 from the gain/image correction controller 304 as best shown in FIG. 14. The TE stabilizer loop adjustment 548 may comprise a means for determining an average signal 912 coupled to the gain corrected signal from the gain/image correction controller 304. The average signal determining means 912 comprises a feedback signal output 906. An average signal representative of the average temperature of the array of microbolometers, is determined from the gain corrected signal so as to generate a feedback signal on the feedback signal output 906. The feedback signal may advantageously be proportional to the average signal. The TE stabilizer control 546 may comprise a means for generating a temperature control signal 902 including an input for accepting the feedback signal output 906. The temperature control signal means 902 includes a temperature control output 904 for carrying a temperature control signal proportional to the feedback signal. A thermal stabilizer 326 is in contact with the microbolometer focal plane array. The thermal stabilizer 326 has an input coupled to the temperature control output and responds to the temperature control signal to adjust the average temperature of the microbolometer focal plane array 100 as indicated by coupling 910.

In one embodiment of the apparatus of the invention the thermal electric stabilizer 326 may advantageously comprise a thermoelectric cooler. The means for determining an average signal 912 may advantageously comprise a microprocessor or be executed as a computer program carried out in the controller 318. The temperature control signal generating means 902 may comprise a conventional power amplifier.

In useful embodiments of the apparatus of the invention the average signal determining means may be coupled to receive data from each microbolometer in the FPA or from a selected portion of microbolometers in the array. In this way, the method and apparatus of the invention, for the first time, exploits the temperature sensitivity of the FPA bolometer elements to stabilize the array itself at the average temperature of the bolometer elements in the array.

In operation, the method of the invention provides a computer controlled method for thermal stabilization of a microbolometer focal plane array wherein each process step is implemented in response to a computer generated command. The computer controlled method comprises the steps of:

A. reading out temperature data from each of a plurality of microbolometers in the microbolometer focal plane array;

B. determining an average signal from the temperature data;

C. generating a feedback signal where the feedback signal is proportional to the average signal;

D. generating a temperature control signal proportional to the feedback signal; and E. stabilizing the temperature of the microbolometer focal plane array by adjusting the average temperature of the microbolometer focal plane array in response to the temperature control signal.

In one embodiment, the step of stabilizing the temperature comprises the step of adjusting the temperature of a thermal electric stabilizer coupled to the microbolometer focal plane array. Temperature adjustment may be done continuously or at periodic intervals as desired and as may depend upon the application and operational environment.

In one alternate embodiment of the invention using a separate temperature sensor on the array substrate, the TE stabilizer may keep the FPA temperature stable to within 100 microkelvins for the following parameters:

sensor resistance: $5K\Omega \leq R \leq 20K\Omega$ temperature coeff: $-2\%/K$

A separate temperature sensor circuit may be implemented by placing the sensor into one leg of a differential bridge. The two power leads to the bridge may be automatically switched so that differential measurements may be taken with the bridge powered both ways to cancel out any drift in a dc driving source. The bridge resistors have a value R, equal to the resistance of the sensor. To obtain an absolute temperature accurate to within 1 degree kelvin, for the temperature coefficient of $-2\%/K$, the value of R must be accurate to within 2%. For the given range of sensor resistance, there may exist N total different values for the bridge:

$1.02^N=(20K/5K)$ $N=\log(4)/\log(1.02)$ $N=70$

Thus, each sensor must be measured to select the appropriate resistors for assembly. The voltage difference across the bridge for a driving voltage of 12 volts will be approximately 6 $\mu v$ for a 100 $\mu K$ change in temperature. This voltage will then be amplified by approximately 100,000 and sampled by an analog-to-digital converter for input to the background processor. The processor may be used to control the power drive circuits for the TE stabilizer.

Now referring to FIG. 14 which shows a schematic of a gain correction image correction controller as employed in one embodiment of the invention. The gain controller 304 provides gain coefficients for the offset corrected data from the focal plane array 100. The gain controller 304 further compiles a histogram of the data gathered by the focal plane array 100.

A gain/histogram/compensation memory 610 provides data including a gain compensation factor. The data further includes a code for defective pixels. The code provides information on whether a pixel is defective and may also include neighboring pixel address data. A defective pixel decoder 624 receives the data and determines whether a current pixel is defective. If the current pixel is defective, the defective pixel decoder 624 may use the neighboring pixel data to determine a neighboring pixel to substitute for the defective pixel. The defective pixel decoder 624 passes the gain compensation factor to a multiplexer 622 to multiply the offset signal by the gain factor. Multiplexer 622 passes the gain compensation factor with unity gain or as provided by defective pixel decoder 624 to a multiplier 626. The offset controller 302 provides offset corrected data from the focal plane array 100 to the multiplier 626. The multiplier 626 multiplies the offset corrected data with the appropriate gain correction factor. A clamp 620 may receive the multiplied data. The clamp 620 may function as a window to pass a selected predetermined range of values. The gain corrected data may be provided to a display unit for display.

In one preferred embodiment, the gain correction factor may comprise one bit to the left of the decimal point, and fifteen bits to the right of the decimal point. The offset corrected data may comprise thirteen bits to the left of the decimal point, and one bit to the right of the decimal point. The clamp may pass thirteen bits to the left of the decimal point and I bit to the right of the decimal point from a thirty bit multiplied data output.

The gain corrected data may also be provided to construct a histogram. A clamp/scale unit 618 receives the gain corrected data and clamps and scales the data to a predetermined scale. A max/min generator 616 receives the scaled data. The scaled data is also provided to a high bit generator 614. The high bit generator 614 adds a high bit to the scaled data. Multiplexer 612 receives the data from the high bit generator 614 and provides the data as an address to the gain/histogram/compensation memory 610.

The gain controller 304 stores a histogram in gain/histogram/compensation memory 610. Summer 606 receives a value of the address resulting from the pixel output and increments the value by one, as long as the value is less than a predetermined value, for example, in one example embodiment, 255. The summer provides the incremented value to a multiplexer 608. Multiplexer 608 writes the incremented value back into the gain/histogram/compensation memory 610. All pixels on the focal plane array 100 are scanned.

Figure 15:
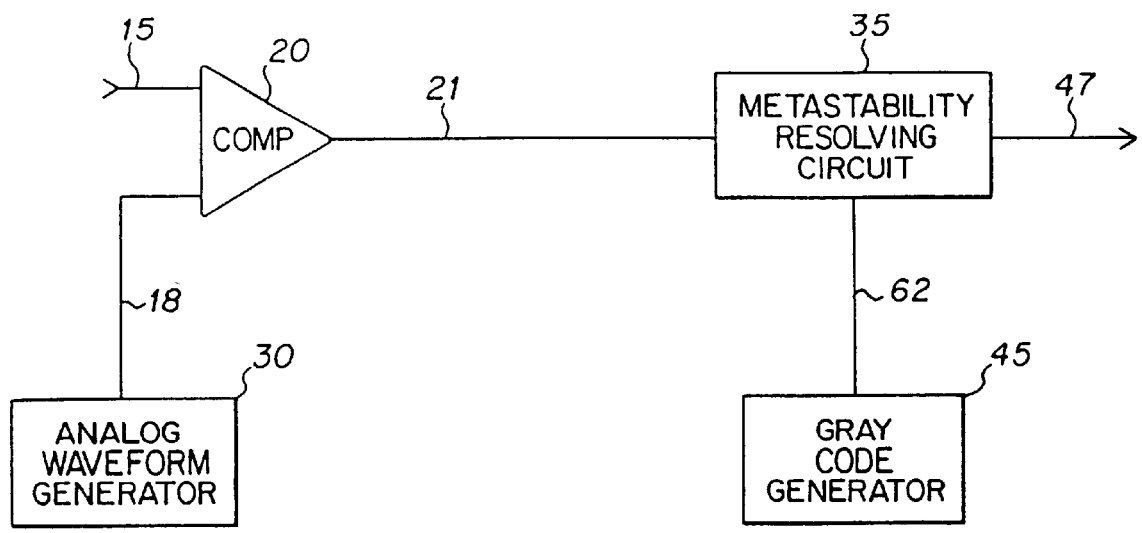
FIG. 15 is a schematic block diagram of an analog-to-digital converter according to the invention.

Reference is now made to FIG. 15 which is an overall schematic block diagram of the analog-to-digital converter of the invention. Analog input signal 15, the analog signal to be converted, is connected to one input of an unclocked analog comparator 20. The other input of the comparator 20 is connected to an analog ramp signal 18. Analog waveform generator 30 generates the analog ramp signal 18. When the analog ramp signal 18 substantially equals the analog input signal 15, the comparator generates output signal 21. The comparator output signal 21 is connected to a control input of a metastability resolving circuit 35. Synchronized with the analog waveform generator 30 is a Gray code generator 45 that generates a digital Gray code on a digital Gray code bus 62. The digital Gray code bus 62 is connected to a data input of the metastability resolving circuit 35. The metastability resolving circuit 35 stores the states of the digital Gray code on bus 62 in response to an active state of the comparator output signal 21. As a result, the digital output signal 47 of the metastability resolving circuit 35 is a digital representation of the magnitude of the analog input signal 15 when the magnitude of the analog ramp signal 18 equals the magnitude of the analog input signal 15.

Figure 16:
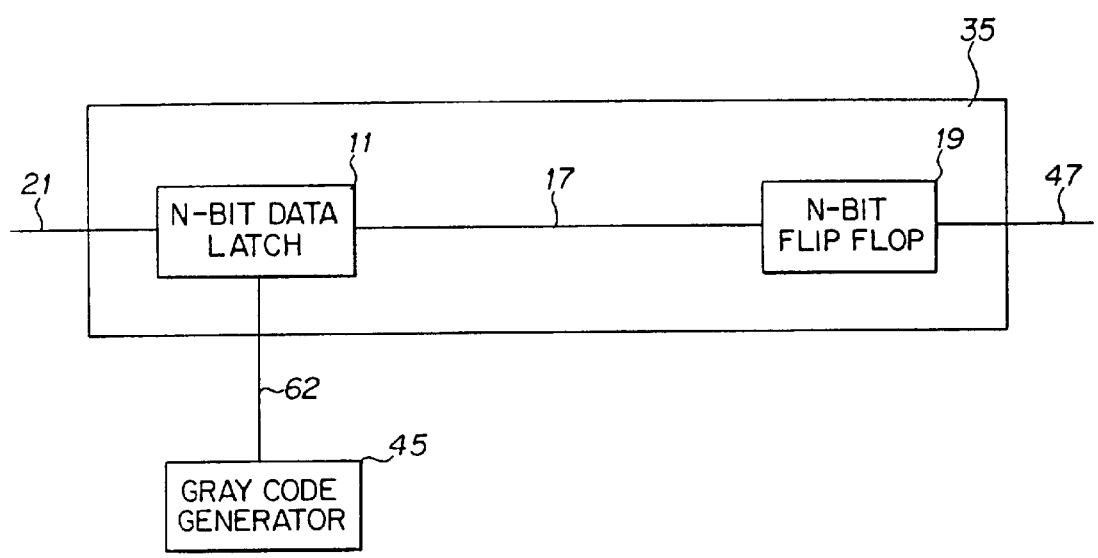
FIG. 16 is a schematic block diagram of the metastability resolving circuit illustrated in FIG. 15.

Reference is now made to FIG. 16, which illustrates the metastability resolving circuit 35 in more detail. Comparator output signal 21 is connected to the control input of an N-Bit data latch 11. N is the number of bits of resolution that the analog signal 15 is digitized (converted) into by the analogto-digital converter. N can be any number and is typically between eight and sixteen for most applications. The N-bit data latch 11 data input is connected to the digital Gray code bus 62 from the Gray code generator 45. The data latched by the N-bit data latch 11 (which is a code generated by Gray code generator 45) is provided on line 17 to N-bit flip-flop 34. N-bit flip-flop 34 resolves the metastability of the system by storing the data on line 17 a predetermined time period after the N-bit data latch 11 has stored the state of the Gray code generator 45. The digital output 47 is provided as described above.

Figure 16A:
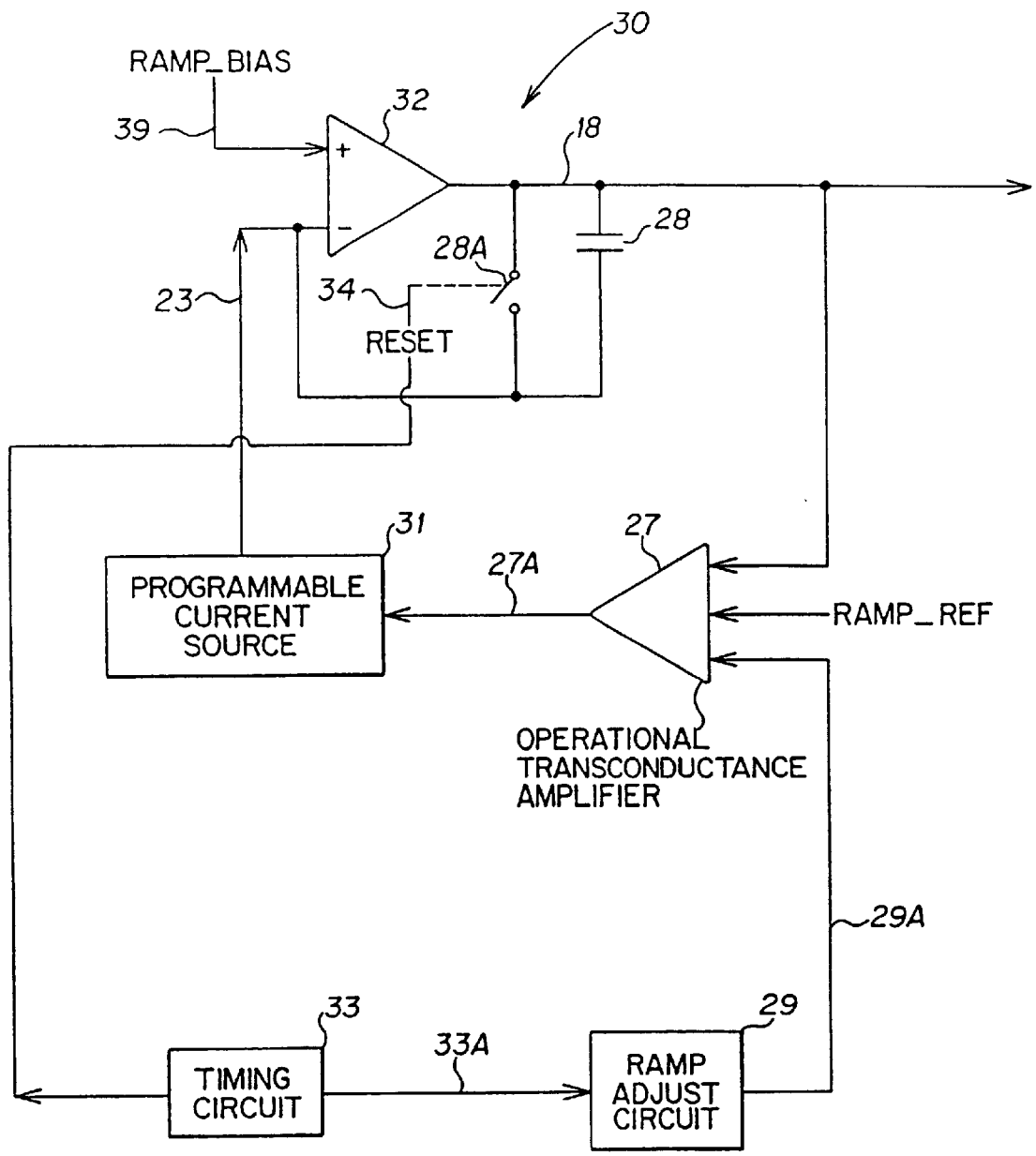
FIG. 16A is a schematic block diagram of the analog waveform generator illustrated in FIG. 15.

Reference is now made to FIG. 16A, which illustrates a schematic block diagram of analog waveform generator 30 illustrated in FIG. 15. Operational amplifier 32 provides the analog ramp signal 18 by providing an output signal to integration capacitor 28. RESET signal 34 is generated by timing circuit 33 and activates switch 28A to discharge capacitor 28 when a new conversion is to be initiated. One input 39 of operational amplifier 32 is connected to a RAMP_BIAS signal and a second input 23 is connected to the output of a programmable current source 31. Programmable current source 31 is controlled by operational transconductance amplifier 27. Amplifier 27 has a first input connected to the analog ramp signal 18. A second input of amplifier 27 is connected to a ramp reference voltage RAMP_REF. A third input of amplifier 27 is connected to the output of ramp adjust circuit 29. The starting voltage of the analog ramp is adjustable by changing the RAMP_BIAS voltage. The slope of the analog ramp signal 18 is controlled by amplifier 27. By changing the output of programmable current source 31 in response to a current signal 27A from transconductance amplifier 27, the slope of the analog ramp signal 18 can be changed. In response to control signal 33A from timing circuit 33, issued just before ramp signal 18 is to terminate, ramp adjust circuit 29, via control signal 29A, turns amplifier 27 on to sample the difference between the RAMP_REF voltage and the voltage of analog ramp signal 18. Transconductance amplifier 27 converts this voltage difference to a current 27A that is used to control programmable current source 31. After programmable current source 31 has been adjusted, timing circuit 33, via control signal 33A, turns amplifier 27 off to open the feedback loop, issues RESET signal 34 to discharge capacitor 28 using switch 28A, and then opens switch 28A to begin another integration cycle.

Figure 17:
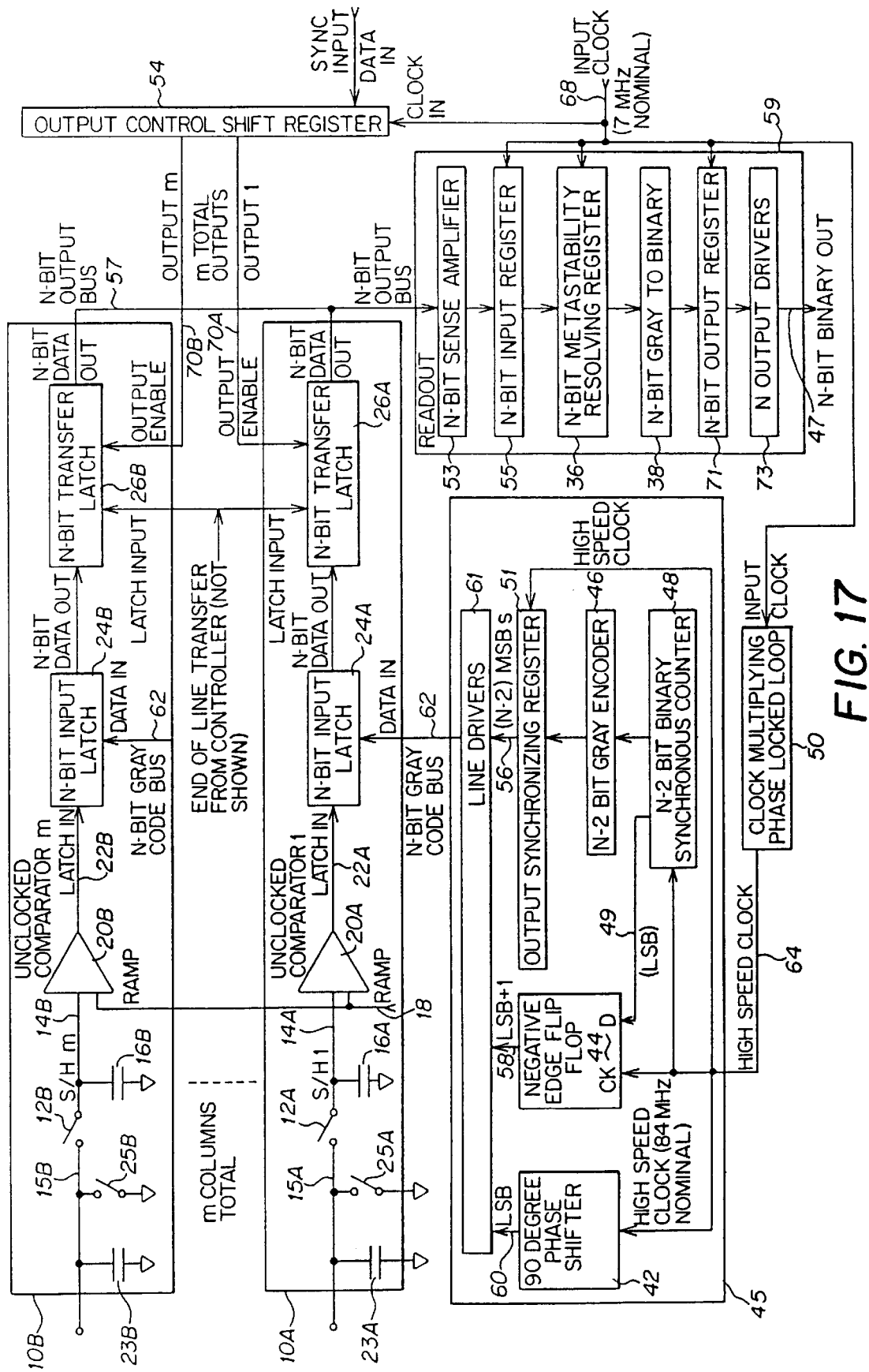
FIG. 17 is a schematic block diagram of an array of analog-to-digital converters according to the invention.

Reference is now made to FIG. 17, which is a schematic block diagram of parallel analog-to-digital converters 10A and 10B. Only two converters are shown for clarity; there could be m number of converters in an array. In one preferred embodiment there are 328 converters in an array. Each analog-to-digital converter is connected to the digital Gray code bus 62 and an output bus 57. The digital Gray code bus 62 is connected to each data input of the m data latches. For clarity, only the connections to data latches 24A and 24B are shown. The data input of each data latch is driven by the gray code generator 45. The N-bit output bus 57 is connected to the data output of each transfer latch (latches 26A and 26B being illustrated) and is read by multiplexer readout circuit 59.

The analog signal on line 15A, the signal to be converted, is stored by capacitor 23A until sampling switch 12A is closed, thereby transferring the charge to capacitor 16A. Capacitor 16A integrates the analog signal 15A until switch 12A is opened. After a predetermined time interval has passed, switch 12A is opened and switch 25 is closed, thus resetting capacitor 23A at the start of each conversion period. Those skilled in the art will recognize that any charge transfer device or circuit may be used to transfer the signal to be compared. During the read out phase the sampled signal 14A is compared to an analog ramp signal 18 by comparator 20A. When the sampled signal 14A is equal to or at some predetermined potential with respect to the analog ramp signal 18, the output 22A of the comparator 20A activates latch 24A. The output of the comparator 20A is connected to the enable input of latch 24A. The latch 24A, connected to digital Gray code bus 62, stores the state of the gray code count at the time the analog ramp signal 18 equals the sampled signal 14A in response to comparator output signal 22A. The output of latch 24A is provided to a transfer latch 26A. Output control shift register 54, connected to transfer latches 26A and 26B, selects the output of a particular analog-to-digital converter from the array of converters. The output of each transfer latch is connected to sense amplifier 53 via N-bit output bus 57, part of multiplexer readout circuit 59. Only one transfer latch is active and supplying an output to bus 57 at any one time. The output control register 54 is synchronized with input clock 68.

Multiplexer readout circuit 59 will now be described. One skilled in the art will appreciate that each of the circuit blocks in multiplexer readout circuit 59 is N-bits wide to accommodate the number of bits from each transfer latch. The output of sense amplifier 53 is connected to the input of input register 55 which is clocked by input clock 68. Input register 55 latches the data on N-bit output bus 57 from whichever N-bit transfer latch has been enabled by output control shift register 54. The output of register 55 is connected to the input of a metastability resolving register 36 that is also clocked by input clock 68. Metastability resolving register 36 is clocked so that one full clock cycle after the state of N-bit output bus 57 has been latched into input register 55, the data from input register 55 is provided to the input of metastability resolving register 36. Register 36 resolves the metastability of the conversion that may have arisen when the digital signal on bus 62 was latched by output signal 22A from analog comparator 20A. Circuit analysis of this latch train arrangement has indicated that the metastability of the system is improved by a factor of at least $2^{30}$ by the addition of metastability resolving register 36. The output of the metastability resolving register 36 is connected to a Gray code decoder 38 that converts the Gray code signal to a standard binary signal. The Gray code decoder 38 may use an exclusive-ORing (XORing) process in which the output of each latch in the metastability resolving register 36 is exclusive-ORed (XORed) with an adjacent bit that has in turn been exclusive-ORed with another bit, and so on. The standard binary N-bit code output by Gray code decoder 38 is provided to the data input of N-bit output register 71, which latches the output value in response to input clock 68. The output of output register 71 is provided to N output drivers 73 that provide the N-bit converted binary output signal 47.

Input clock 68 is also provided to a clock multiplying phase locked loop circuit 50 that generates a high speed clock 64. In one embodiment of the invention, the clock multiplier is a 12x clock multiplier. In one embodiment of the invention, for example, input clock 68 is a 7 MHz nominal clock and clock multiplier 50 increases this by a factor of 12 to 84 MHz.

Gray code generator 45 will now be described. The digital Gray code on bus 62, which in one embodiment of the invention is an N-bit binary gray code, is generated by concatenation of three bit streams: a least significant bit 60, a next-to-least significant bit 58 and a N-2 bit gray code word 56. The high speed clock 64 clocks an N-2 bit synchronous binary counter 48. The N-2 bit synchronous counter 48 provides an output signal to an N-2 bit Gray code encoder 46. The Gray code encoder provides the N-2 most significant bits 56 of the digital Gray code on bus 62. Gray code encoder 46 provides a Gray code by XORing each bit output by counter 48 with an adjacent output bit.

The high speed clock 64 and the N-2 bit synchronous counter's least significant bit 49 is connected to a negative edge triggered flip-flop 44. The negative edge triggered flip-flop 44 provides the next to least significant bit signal, LSB+1 58, as part of the digital Gray code on bus 62.

The high speed clock 64 is also connected to a 90° analog phase shifter 42. The 90° phase shifter 42 generates the least significant bit signal, LSB 60, as part of the digital Gray code on bus 62 by shifting the high speed clock 64 by 90°.

In one example embodiment, N is equal to 13 bits, synchronous counter 48 and Gray code encoder 46 provide the 11 most significant bits on Gray code bus 62. A 12th bit (LSB+1) is supplied by dividing a 75 (approximately) MHz clock by two and then latching it with the falling edge of the 75 MHz clock in flip-flop 44. The 13th bit (LSB) is generated by delaying the 75 MHz clock by precisely 90°, ¼ of a complete clock cycle, in closed loop phase shifter 42. This type of phase shifter is sometimes referred to as a delay locked loop.

Figure 18:
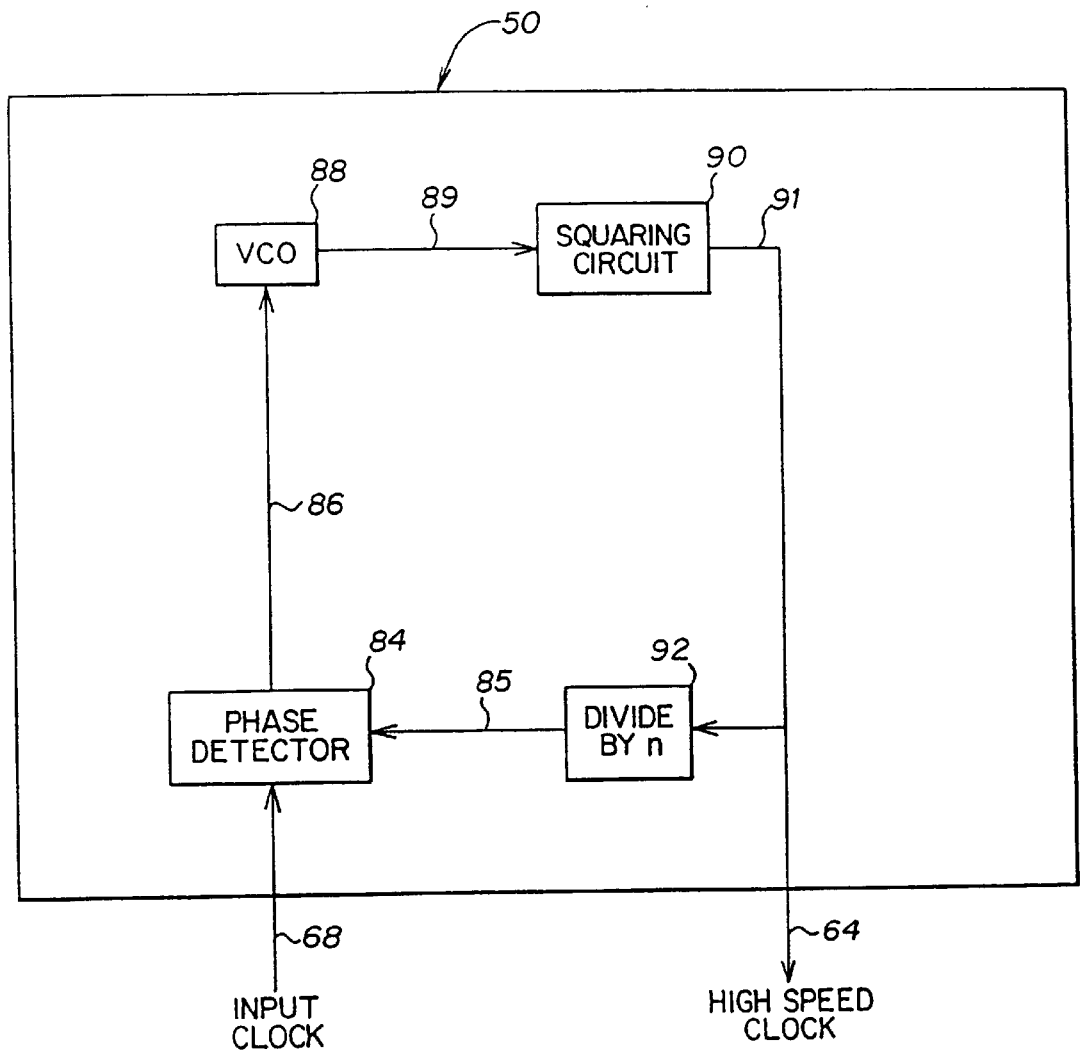
FIG. 18 is a schematic block diagram of the clock multiplying phase locked loop illustrated in FIG. 17.

Reference is now made to FIG. 18, which illustrates in more detail, the clock multiplying phase locked loop 50 of FIG. 17. Clock multiplier 50 includes a phase detector 84 that detects a difference in phase between input clock 68 and a frequency divided version of high speed clock 64 on line 85. The output 86 of phase detector 84 is used to control a frequency multiplying voltage controlled oscillator (VCO) 88. VCO 88 increases the frequency of input clock 68 by a predetermined factor. In one example, VCO 88 increases the frequency of input clock 68 by a factor of 12 to produce high speed clock 64. The output 108 of VCO 88 is provided to a "squaring" circuit 90. The function of squaring circuit 90 is to shape the output signal 91 so that high speed clock 64 has a fifty percent duty cycle, i.e., a "square" output. High speed clock 64 is also provided to a divide by n circuit 92 that divides the frequency by a factor n so that the frequency of the clock signal delivered on line 85 is equal to the frequency of input clock 68. As discussed before, in one embodiment, if VCO 88 increases the clock frequency by a factor of 12, then n would be 12 so that divide by n circuit 92 reduces the frequency of high speed clock 64 by a factor of 12 before providing that signal to phase detector 84. In one embodiment, VCO 88 may include a ring oscillator.

Figure 19:
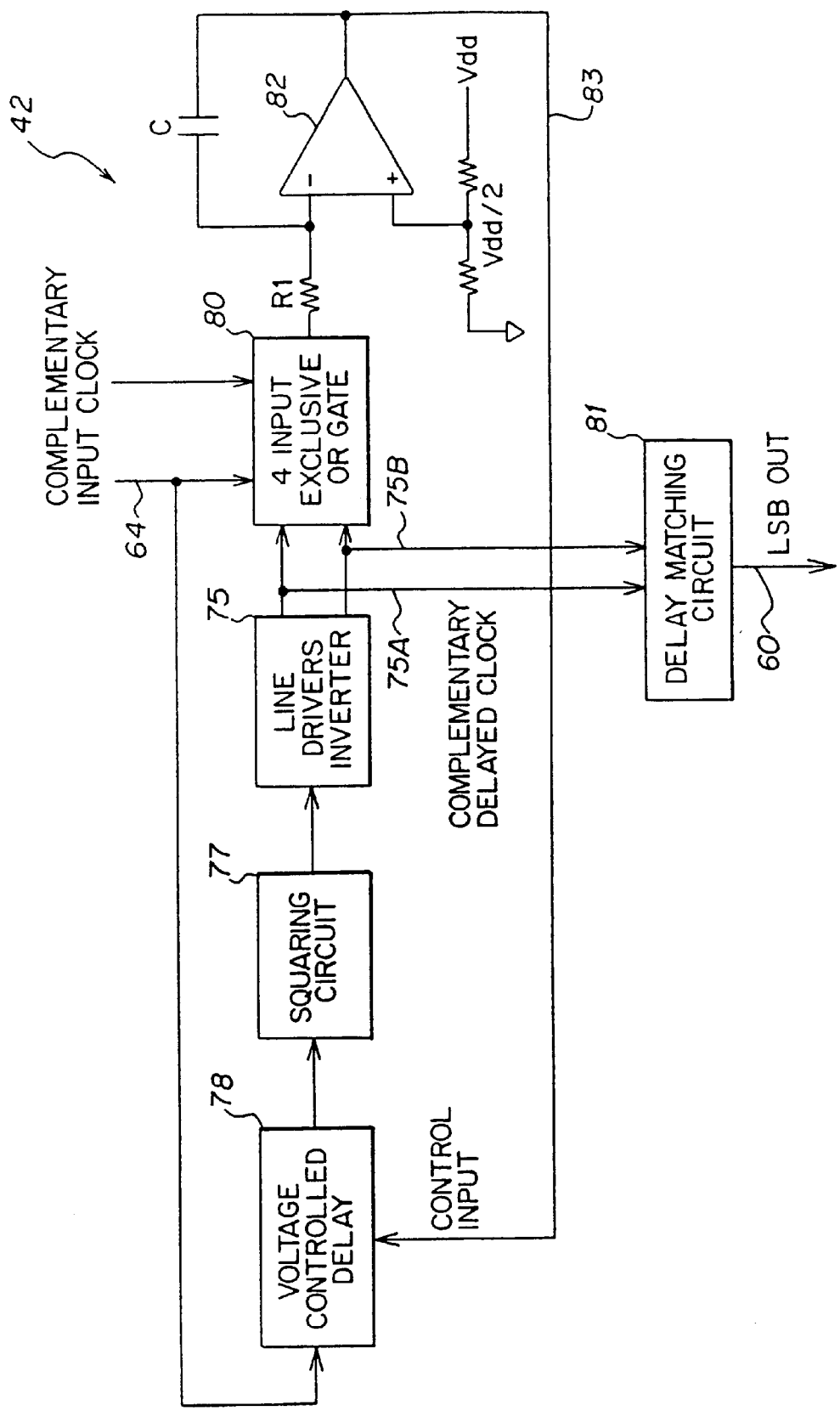
FIG. 19 is schematic block diagram of the 90° phase shifter illustrated in FIG. 17.

Reference is now made to FIG. 19, which FIG. is a schematic block diagram of the 90° analog phase shifter 42 illustrated in FIG. 17. High speed clock 64 and its complement from clock multiplier 50 are connected to the first and second clocking inputs of a four input exclusive or (XOR) gate 80. XOR gate 80 includes an output coupled to the inverting input of a high gain integrating amplifier 82. Amplifier 82 outputs a control signal 83 which is coupled to a control input of a voltage controlled delay circuit 78. The voltage controlled delay circuit 78 also receives a clocking signal from the high speed clock 64. The high gain of amplifier 82 ensures that the delay is always 90° even in the presence of variations in component values and clock frequency. The voltage controlled delay circuit 78 outputs a delayed signal in response to the control signal 83 and clock 64 to a "squaring" circuit 77. Squaring circuit 77 shapes the delayed signal so that it is symmetrical and has a fifty percent duty cycle (i.e., a "square" output) and outputs a signal to the input of line driver inverter 75. Squaring circuit 77 is similar to squaring circuit 90, previously described. Line driver inverter 75 outputs a first line driver inverter signal 75A and a second line driver inverter signal 75B to third and fourth inputs of the four input exclusive OR gate 80. The first and second line driver inverter signals are also coupled to first and second inputs of a delay matching circuit 81. Signals 75A and 75B comprise a complementary delayed clock. Delay matching circuit 81 ensures that the delay experienced by each signal 75A and 75B is the same, so that the signals remain in the proper phase relationship with each other. The delay matching circuit 81 outputs LSB 60.

Figure 20:
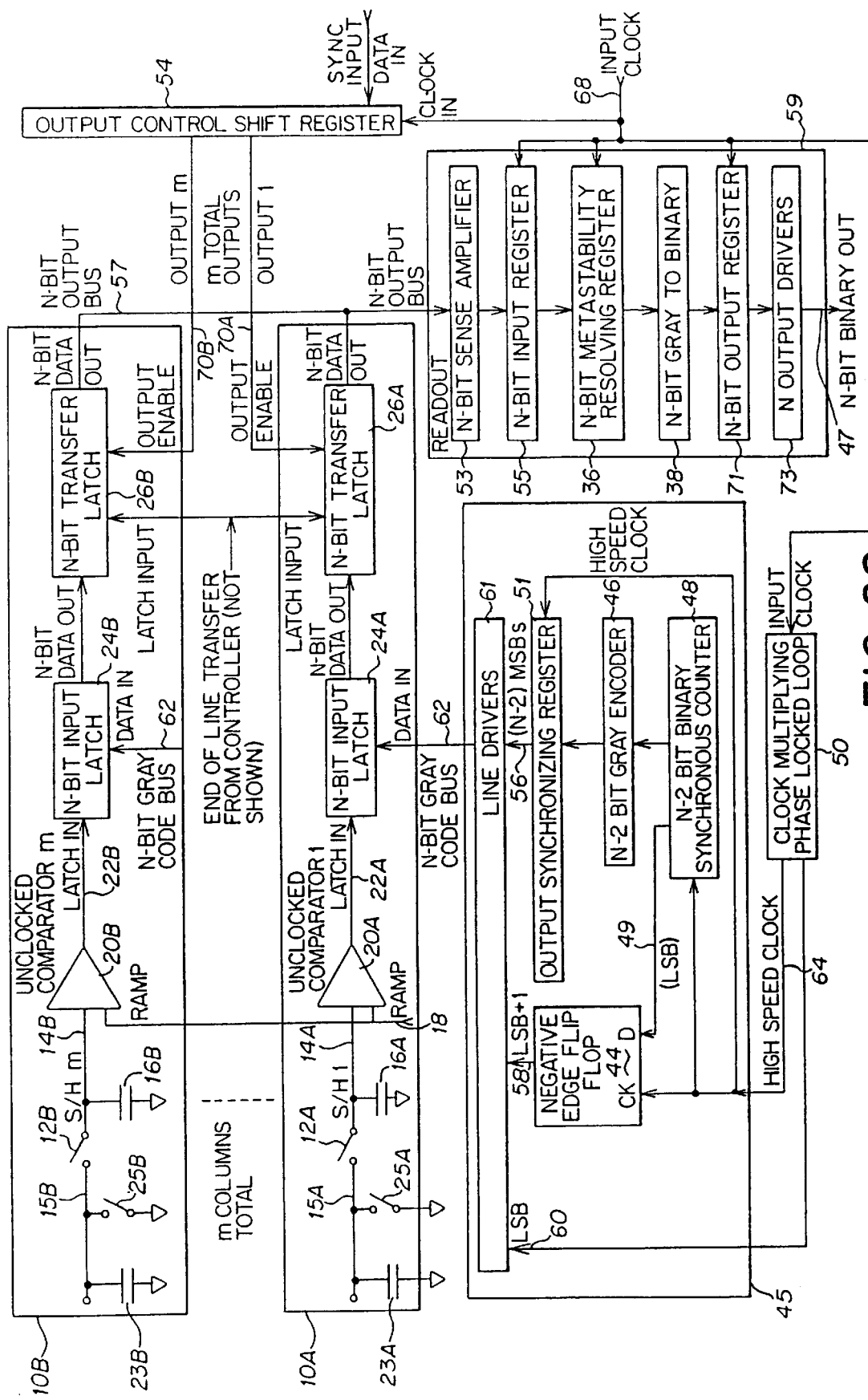
FIG. 20 is a schematic block diagram of an alternate embodiment of the circuit illustrated in FIG. 17.

Reference is now made to FIG. 20, which is a schematic block diagram of an alternate embodiment of the circuit of FIG. 17. In the circuit of FIG. 20, the 90° phase shifter 42 of FIG. is 17 has been eliminated. In addition, clock multiplier 50 has been modified so as to provide LSB 60 directly. In all other respects, the operation of FIG. 20 is the same as already described in connection with FIG. 17.

Figure 21:
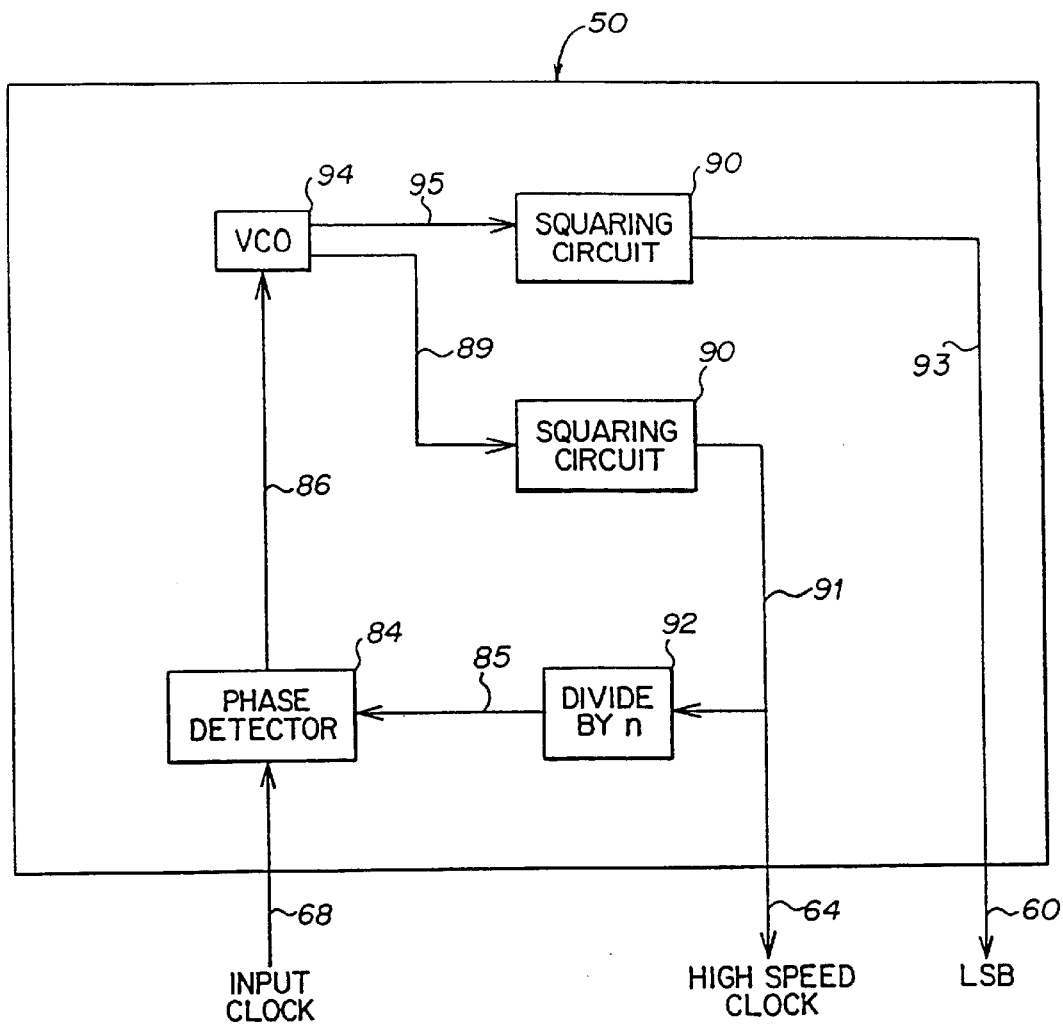
FIG. 21 is a schematic block diagram of a two phase voltage controlled oscillator and squaring circuitsed in the circuit of FIG. 20.

Reference is now made to FIG. 21, which FIG. is a schematic block diagram of the clock multiplier 50 of FIG. 20. In FIG. 21, as in FIG. 18, input clock 68 is provided to a phase detector 84 that provides a control signal 86, in response to input clock 68 and signal 85, to a voltage controlled oscillator 94. VCO 94 also multiplies the output frequency provided on line 108 to squaring circuit 90 in order to generate high speed clock 64 on line 91. The output of squaring circuit 90 on line 91 is additionally provided to divide by n circuit 92 that delivers control signal 85 in the same manner as described in connection with FIG. 4.

VCO 94 also provides a second output 95 that is phase shifted 90° with respect to output 108 and then provided to another squaring circuit 90. Squaring circuit 90 operates in the manner described in connection with FIG. 4 to provide a "square" output for the LSB 60 on line 93.

Figure 22:
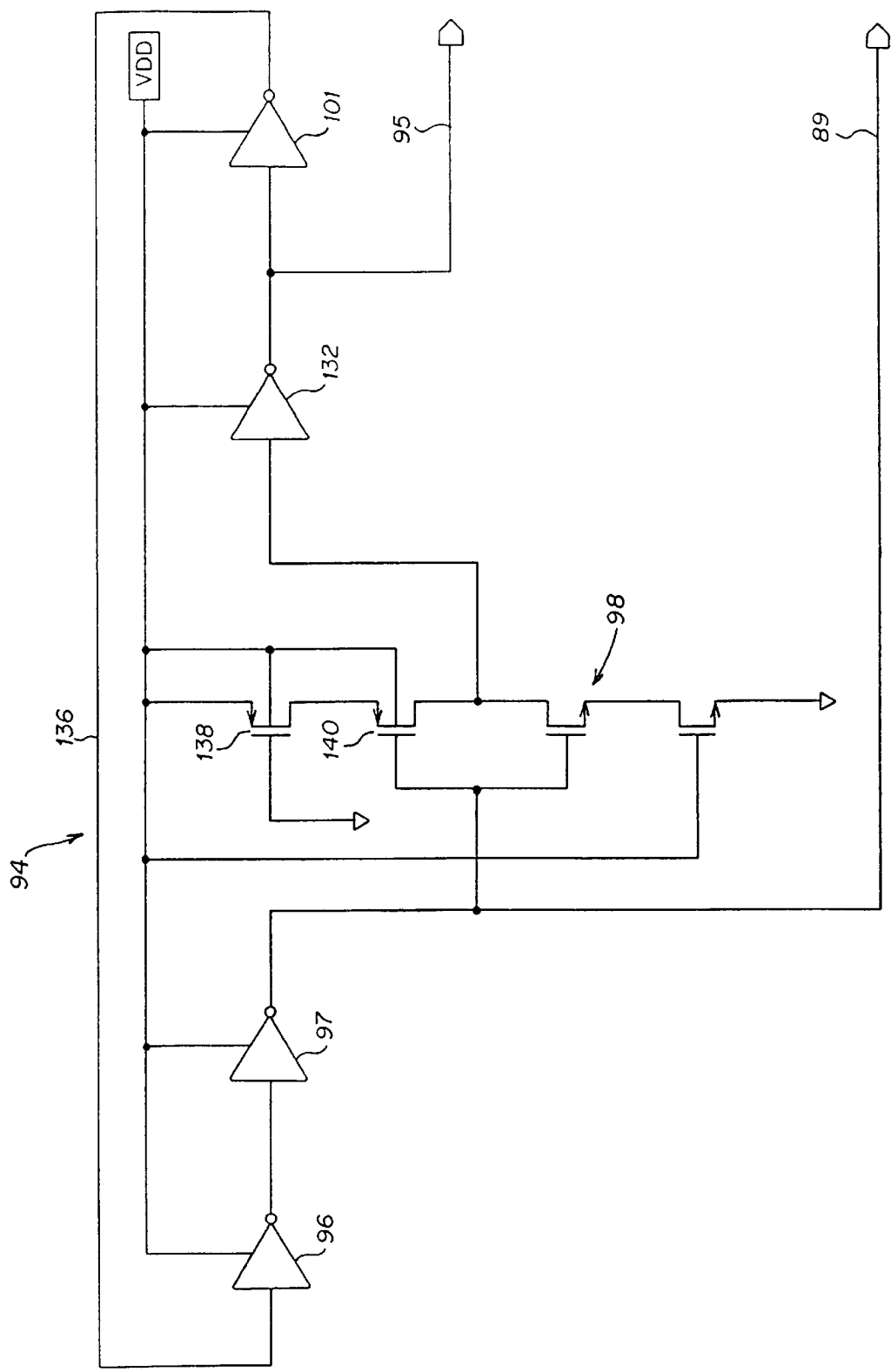
FIG. 22 is a detailed schematic circuit diagram of the voltage controlled oscillator illustrated in FIG: 21.

Reference is now made to FIG. 22, which FIG. is a schematic diagram of VCO 94. VCO 94 provides two outputs 108, 95 that are 90° out of phase from each other. VCO 94 is a ring oscillator formed from an odd number of inverter stages connected in a loop. In particular, VCO 94 includes inverters 96, 97, 98, 132, and 101. The output of inverter 101 is connected via line 136 to the input of inverter 96 in order to form the ring. If t is the time delay of one of the inverters and p is the number of stages in the oscillator, then the oscillation frequency f is:

$$f=1/(2pt) \qquad (1)$$

Changing the frequency is accomplished by changing the power supply voltage of the inverter chain, thus changing time t. In the case of the CMOS inverter, the propagation delay increases as the supply voltage is decreased.

The phase shift per stage in the ring oscillator is:

$$\text{Phase/stage}=180/p \qquad (2)$$

For example, in the five stage oscillator illustrated in FIG. 22, the phase shift per stage is 36°. Thus, a tap two stages away from the main output will have a 72° phase shift, while a tap three stages away from the main output will have a 108° phase shift. If all of the inverters are identical, then a 90° phase shift is not possible.

However, if the different inverters in the ring oscillator are not identically constructed, then a 90° phase shift between inverters in the ring oscillator can be obtained. In a CMOS inverter, the delay through the inverter depends upon a number of factors, including the size and shape of the component transistors and the amount of capacitive loading on its output. Adjusting any of these factors to increase the propagation delay of one of the inverters with respect to the remaining inverters in the ring can be used to provide the required 90° phase shift.

In VCO 94 illustrated in FIG. 22, the propagation delay of inverter 98 is adjusted by adding two transistors 138 and 140 that are biased so as to always be in the on state. This increases the propagation delay through inverter 98 so that the total delay through inverters 101, 96, and 97 is about the same as the delay through modified inverter 98 and inverter 132. If the delay through inverters 101, 136, and 97 is the same as the delay through modified inverter 98 and inverter 132, then there is exactly a 90° phase shift between outputs 108 and 95.

Figure 23:
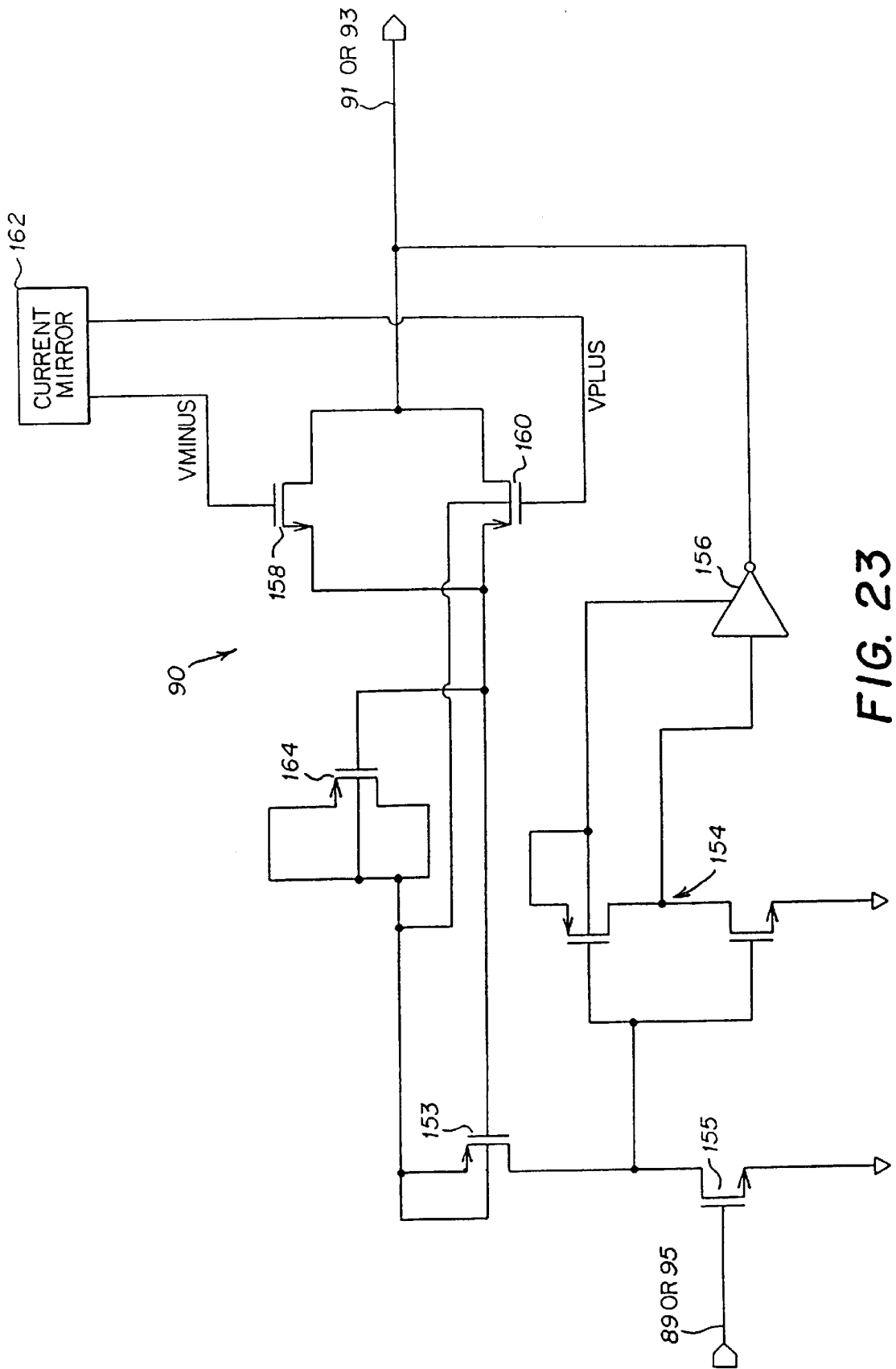
FIG. 23 is a detailed schematic circuit diagram of the squaring circuit illustrated in FIG. 21.

Reference is now made to FIG. 23, which FIG. is a schematic circuit diagram of squaring circuit 90 illustrated in FIGS. 18 and 21. Squaring circuit 77 in FIG. 19 also operates in the same manner as squaring circuit 90.

As illustrated in FIG. 23, the output of VCO 94 is provided to squaring circuit 90. Obviously, in the case of the circuit illustrated in FIG. 23, two squaring circuits are provided, one for each output of VCO 94.

Typically, VCO 94 operates at a reduced voltage compared to the rest of the circuitry and therefore outputs 108 and 95 need to be translated to the higher voltage level of the rest of the circuits. In addition, the propagation delay generally will not be the same for the rising and falling edges of the output signal and therefore the output of the level translator circuit will not be symmetrical, i.e., have a "square" output or fifty percent duty cycle, even though the signals internal to the ring oscillator are symmetric. Circuit 90 thus incorporates the level translator into a closed loop feedback circuit that adjusts the input threshold as needed to maintain the symmetry of the output signal.

The level shifter includes transistors 150 and 152, and inverters 154 and 156. Two current source transistors 158 and 160 are controlled by voltages VMINUS and VPLUS. The voltages VMINUS and VPLUS are supplied by current mirror 162 and control the amount of current delivered by the transistors 158 and 160. A feedback loop of signal 91 or 93 is provided through transistors 158, 160, transistor 164, to level shifting transistors 150 and 152. If the waveform of output signal 91 or 93 becomes asymmetrical, i.e., not "square", transistors 158, 160 respond by changing the gate voltage on the input stage current source transistor 150 in a direction that reestablishes symmetry of the output. Additionally, transistor 164, used as a capacitor, filters out any ripple voltage and sets the response time of the feedback loop.

Figure 24:
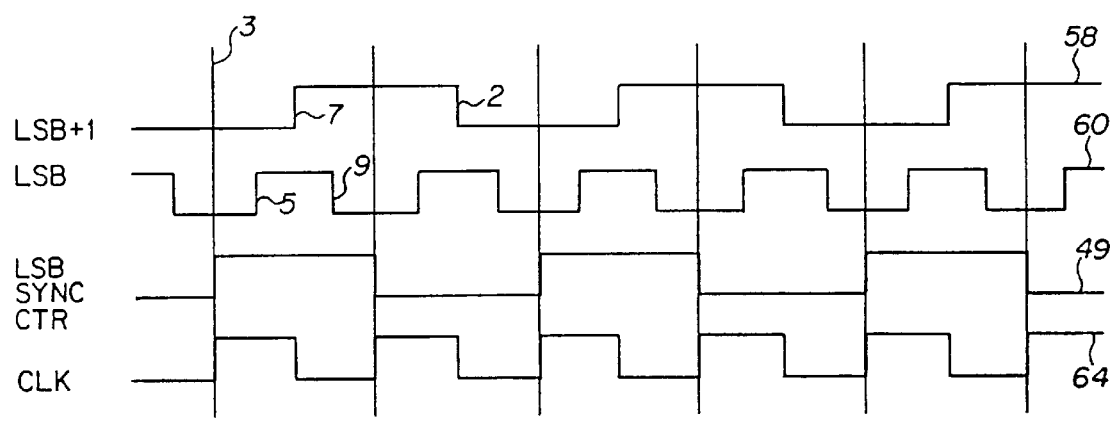
FIG. 24 is a timing diagram illustrating the temporal relationship among the least significant bits of the Gray code signal.

Reference is now made to FIG. 24, which is a timing diagram of the LSB 60 and LSB+1 58. The timing diagram of FIG. 24 illustrates the operation of either the circuit of FIG. 17 or the circuit of FIG. 20. The high speed clock 64 transitions from low to high at time 3. The least significant bit 4 of the N-2 bit binary counter 48 transitions on the low to high transition of the high speed clock 64. The LSB 60, derived from the high speed clock 64, transitions high at time 5 and low at time 9. The LSB+1 58, derived from the counter least significant bit 4, transitions high at time 7 and low at time 2. The N-2 most significant bits 56 of the Gray encoded signal transition only at time 3 while the LSB 60 and LSB+1 58 signals do not change at time 3. At times 2, 5, 7, and 9 only one of these signals changes at a time, thus meeting the Gray code requirement of having only a single bit change when there is a change in the count.

One skilled in the art will appreciate that rather than using an input clock having a frequency that is multiplied in order to provide a high speed clock, an external high speed clock could be used to control counter 48, flip-flop 44, and 90° phase shifter 42.

One advantage of the present invention is that the Gray code least significant bit frequency may be equal to the frequency of the clock that is used to control the circuit. This means that the least significant bit frequency may be equal to the maximum toggle frequency for the flip-flop. Conventionally, for a typical Gray code, the master clock frequency is four times the frequency of the least significant bit of the Gray code. In the present invention, by contrast, the frequency of the least significant bit of the Gray code can be equal to the clock frequency. Therefore, the clock frequency is only limited by the inherent frequency limitations of the clock counter circuitry itself. This allows for higher conversion rates then conventionally achievable.

For a typical 2 micron CMOS process at room temperature, this frequency limit is about 150 MHz, and about 500 MHz at 80° K. For a typical 1 micron CMOS process, this frequency limit is about 500 MHz at room temperature, and may be more than 1 Ghz at 80° K. In one embodiment of the invention, a 72 MHz master clock generates a Gray code with 3.5 ns resolution which allows a 13 bit conversion in 30 μs. A 500 MHz master clock generates a Gray code with 500 μs resolution, allowing a 16 bit conversion in 33 μs or 12 bits in 2 μs. With several hundred of these converters on one chip, the total conversion rate may be on the order of 100 MHz. The estimated power is less than 50 μW per channel. As a result, the present invention allows the relatively slow single slope method of analog-to-digital conversion, when a array of such converters are used on a single chip, to provide relatively high conversion rates, while consuming low amounts of power. Furthermore, the simple design of single slope analog-to-digital converters saves power and allows integration of a large number of these converters on a single integrated circuit, particularly when using CMOS technology.

A Gray code count is used as the digital signal to be stored when the comparator is activated because, by definition, only one bit changes for each increment of the code. Since only one of the Gray coded bits can be in the process of changing when the latch is enabled, only one of the sampled bits can exhibit metastability, and the resultant code will be uncertain by only one least significant bit. This is in contrast to the case when a standard binary code is used as the digital signal to be stored. Since more than one bit may be changing for each increment of the code, a number of the sampled bits can exhibit metastability.

The use of a Gray code count also advantageously allows the metastability resolution to be determined at a point in the circuit where there is more time to complete it, thus reducing the power and speed requirements of the circuitry. As a result, in the present invention, the metastability resolution can be postponed until after the multiplexing of the data when the data rate is considerably lower than the rate at which the data is provided by each analog-to-digital converter. In particular, in conventional circuits, the metastability resolution might typically be provided when the binary code from a counter is clocked into the N-bit data latches. This might require the metastability resolution to be performed in a very short time interval at a relatively high clock rate. As noted, by contrast, the present invention can accomplish this function using a significantly lower clock rate, which reduces the power and speed requirements of the circuitry.

For example, a 75 MHz (approximately) clock may be used to generate the Gray code. This 75 MHz clock is generated from a 6 MHz (approximately) input clock. The 75 MHz clock is used only for the analog-to-digital conversion; the 6 MHz clock is used for all other functions of the integrated circuit.

By using an array of 328 converters, a conversion is completed in approximately 30 microseconds with a resolution of 13 bits. A conventional approach requires a master clock frequency of approximately 300 MHz, which is higher than the capability of, for example, a conventional 2 micron CMOS process. The use of a gray code allows the metastability resolution to be performed at a rate of 6 MHz on 13 bits rather than 300 MHz on 328 comparators.

The invention also provides a method of converting the analog signals from an array of analog-to-digital converters with a high effective clock rate, and increased resolution. A multitude of input signals, one for each converter, are sampled and held. Signals are formed by integrated the current from an analog source. This signal is held constant on a capacitor for the duration of the conversion process. Next, an analog ramp and a digital counter are simultaneously started. A comparator circuit compares the voltage of the ramp with the sampled and held voltage. When the two are equal, the output of the comparator changes state and causes the value of the digital counter to be stored in an N bit latch. The values stored in the array of latches, which are a digital representation of the various input voltages, are transferred in parallel to another array of latches. Then a new set of conversions can be performed while the results of the previous conversions are multiplexed to form a digital output signal.

For an array of converters, the digital counter and ramp generator are common to all converters. Each converter itself needs only a sample and hold, a comparator, and an array of digital latches.

The circuits of the present invention may be monolithically integrated in semiconductor form using convention CMOS technology.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. Apparatus comprising:
   a semiconductor substrate including an upper level and a lower level;
   a plurality of sensors, fabricated on the upper level, to detect radiation and to output image signals based on the detected radiation; and
   a plurality of switches, fabricated on the lower level, to select at least some of the plurality of sensors,
   wherein a number of electrical connections connecting the plurality of sensors to the plurality of switches is less than two times a number of sensors.

2. The apparatus of claim 1, wherein the number of electrical connections connecting the plurality of sensors to the plurality of switches is equal to the number of sensors plus one.

3. The apparatus of claim 1, further including a vacuum package to seal the semiconductor substrate.

4. The apparatus of claim 1, wherein the sensors are thermal sensors.

5. The apparatus of claim 1, wherein the sensors are resistive microbolometer elements.

6. The apparatus of claim 5, wherein the sensors are constructed and arranged as an uncooled focal plane array.

7. The apparatus of claim 1, wherein the plurality of switches includes a plurality of switch pairs, each switch pair responsive to a sensor control signal to select one sensor of the plurality of sensors.

8. The apparatus of claim 7, wherein the number of electrical connections connecting the plurality of sensors to the plurality of switch pairs is equal to the number of sensors plus one.

9. The apparatus of claim 7, wherein the plurality of switch pairs includes CMOS switches.

10. The apparatus of claim 7, wherein each switch pair includes:
    a first switch connected between a common supply bus and a first terminal of the one sensor; and
    a second switch connected between an image signal output bus to provide the image signals and a second terminal of the one sensor.

11. The apparatus of claim 10, further including processing circuitry coupled to the image signal output bus to process the image signals and to output processed image data based on the image signals.

12. The apparatus of claim 11, wherein the processing circuitry includes offset correction circuitry to compensate errors in the image signals and to output corrected image signals.

13. The apparatus of claim 12, wherein the offset correction circuitry includes means for providing a time-varying compensation signal to compensate errors in the image signals.

14. The apparatus of claim 12, wherein the offset correction circuitry includes means for providing a compensation signal to compensate changes in the image signals due to current-induced heating of the sensors.

15. The apparatus of claim 12, wherein:
    the sensors are resistive microbolometer elements; and
    the offset correction circuitry compensates resistance non-uniformities of the sensors.

16. The apparatus of claim 12, wherein the processing circuitry further includes an analog to digital converter to output the processed image data based on the corrected image signals.

17. The apparatus of claim 16, wherein the processing circuitry is monolithically integrated on the semiconductor substrate.

18. The apparatus of claim 1, further including:
    a temperature sensing element to sense a temperature of the plurality of sensors; and
    a thermoelectric stabilizer to stabilize the temperature at a predetermined value.

19. The apparatus of claim 18, wherein the temperature sensing element is monolithically integrated on the semiconductor substrate with the plurality of sensors.

20. The apparatus of claim 19, wherein the temperature sensing element includes at least one sensor of the plurality of sensors.

21. The apparatus of claim 20, wherein the predetermined value is based on an average temperature of at least some of the plurality of sensors.

22. The apparatus of claim 21, further including means for determining the average temperature.

23. The apparatus of claim 19, further including a vacuum package to seal the semiconductor substrate and the thermoelectric stabilizer.

24. Apparatus comprising:

a semiconductor substrate including an upper level and a lower level;

a plurality of sensors, fabricated on the upper level and arranged as a two-dimensional grid, to detect radiation and to output image signals based on the detected radiation;

a plurality of switch pairs, fabricated on the lower level, each switch pair responsive to a sensor control signal to select one sensor of the plurality of sensors; and processing circuitry including row circuitry and column circuitry to provide the sensor control signal to each sensor to output an image signal, wherein a number of electrical connections connecting the plurality of sensors to the plurality of switch pairs is equal to a number of sensors plus one.

25. The apparatus of claim 24, wherein the two-dimensional grid includes a plurality of basic unit cells, each basic unit cell comprising:

one sensor of the plurality of sensors;

one switch pair of the plurality of switch pairs; and a test transistor, connected in parallel with the one sensor, to output a test signal that emulates the image signal output by the one sensor.

26. The apparatus of claim 25, wherein the processing circuitry includes test circuitry to activate the test transistor of each basic unit cell to output the test signal, the processing circuitry outputting processed image data based on the test signal from each basic unit cell when the test transistor is activated.

27. The apparatus of claim 26, wherein:

the one sensor has a sensor resistance; and the activated test transistor has an on-resistance that is substantially equal to the sensor resistance.

28. The apparatus of claim 25, wherein the two-dimensional grid includes columns of basic unit cells, each column having a column output to provide the image signals and the test signals from the basic unit cells, the one switch pair of each basic unit cell connecting the one sensor and the test transistor between a common supply bus and the column output in response to the sensor control signal.

29. The apparatus of claim 28, wherein the common supply bus is the ground.

30. The apparatus of claim 28, wherein for each column of basic unit cells, the processing circuitry includes:

an amplifier to receive the image signals and the test signals from the column output and to output an amplified column signal;

an integrator to integrate the amplified column signal; and an analog to digital converter to convert the integrated amplified column signal to processed image data.

31. The apparatus of claim 30, wherein the amplifier is a buffered direct injection amplifier comprising:

a lateral bipolar input stage to receive the column output;

a current source load; and a pass transistor, coupled to the lateral bipolar input stage and the current source load, to output the amplified column signal.

32. The apparatus of claim 30, wherein the analog to digital converter includes:

a converter circuit to convert the integrated amplified column signal to a digital signal, the converter circuit including a first register to store the digital signal during a conversion period; and a metastability resolving circuit, coupled to the converter circuit so as to receive the digital signal, to store the digital signal at a predetermined time after the conversion period and output a metastability resolved digital signal based on the digital signal as the processed image data.

33. The apparatus of claim 32, wherein the apparatus is monolithically formed on the semiconductor substrate within a single integrated circuit chip.

34. An array of N sensors, each sensor of the array being connected to at least one other sensor of the array and at least one switch of a plurality of switches, such that a number of electrical connections between the array and the plurality of switches is less than 2N, wherein each sensor of the array is connected to the at least one other sensor and the at least one switch at a common node.

35. An array of N sensors, each sensor of the array being connected to at least one other sensor of the array and at least one switch of a plurality of switches, such that a number of electrical connections between the array and the plurality of switches is less than 2N, wherein:

the sensors are fabricated on an upper level of a semiconductor substrate; and the plurality of switches are fabricated on a lower level of the semiconductor substrate.

* * * * *